(12) United States Patent
Parker et al.

(10) Patent No.: US 12,424,563 B2
(45) Date of Patent: Sep. 23, 2025

(54) DISAGGREGATED ENTROPY SERVICES FOR MICROELECTRONIC ASSEMBLIES

(71) Applicant: Intel Corporation, Santa Clara, CA (US)

(72) Inventors: Rachael J. Parker, Forest Grove, OR (US); David Johnston, Hillsboro, OR (US); Georgios Dogiamis, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 771 days.

(21) Appl. No.: 17/550,457

(22) Filed: Dec. 14, 2021

(65) Prior Publication Data

US 2023/0187371 A1 Jun. 15, 2023

(51) Int. Cl.
*H01L 23/544* (2006.01)
*H01L 23/498* (2006.01)
*H04L 9/32* (2006.01)

(52) U.S. Cl.
CPC ...... *H01L 23/544* (2013.01); *H01L 23/49838* (2013.01); *H04L 9/3278* (2013.01); *H01L 2223/54413* (2013.01)

(58) Field of Classification Search
CPC ............. H01L 23/544; H01L 23/49838; H01L 2223/54413; H04L 9/3278
See application file for complete search history.

(56) References Cited

U.S. PATENT DOCUMENTS

| | | | |
|---|---|---|---|
| 10,459,845 B1 * | 10/2019 | Cariello | G06F 12/10 |
| 2014/0189365 A1 * | 7/2014 | Cox | G06F 21/72 |
| | | | 713/189 |
| 2019/0081804 A1 * | 3/2019 | Chen | H04L 9/0869 |
| 2019/0114097 A1 * | 4/2019 | Tran | G11C 29/48 |
| 2019/0305970 A1 * | 10/2019 | Satpathy | H04L 9/006 |
| 2022/0036949 A1 * | 2/2022 | Asnaashari | H04L 9/0866 |
| 2022/0217003 A1 * | 7/2022 | Cambou | H04L 9/3278 |
| 2022/0376934 A1 * | 11/2022 | Thornton | H04L 9/3278 |
| 2022/0417041 A1 * | 12/2022 | Howard | H04L 9/14 |
| 2023/0187371 A1 * | 6/2023 | Parker | H04L 9/3278 |
| | | | 438/401 |
| 2023/0195200 A1 * | 6/2023 | Suresh | H03L 7/08 |
| | | | 713/322 |
| 2023/0266944 A1 * | 8/2023 | Ivaniuk | H04L 9/0869 |
| | | | 708/250 |

OTHER PUBLICATIONS

"Intel® Digital Random Number Generator (DRNG)", Software Implementation Guide, Revision 2.1, Oct. 17, 2018, 36 pages.

* cited by examiner

*Primary Examiner* — Gary S Gracia
(74) *Attorney, Agent, or Firm* — Akona IP PC

(57) ABSTRACT

A microelectronic assembly is provided, comprising: a first plurality of integrated circuit (IC) dies in a first level, each one of the first plurality of IC dies having respective first physical unclonable function (PUF) circuits; a second IC die having a second PUF circuit and a security circuit; a second plurality of IC dies in a second level, the second level not coplanar with the first level, the first level and the second level being coupled with interconnects having a pitch of less than 10 micrometers between adjacent ones of the interconnects; and conductive pathways between the first plurality of IC dies and the second IC die for communication between the first PUF circuits and the second PUF circuit, the conductive pathways comprising a portion of the interconnects.

20 Claims, 13 Drawing Sheets

DISAGGREGATED ENTROPY SERVICES FOR MICROELECTRONIC ASSEMBLIES

TECHNICAL FIELD

The present disclosure relates to techniques, methods, and apparatus directed to disaggregated entropy services for microelectronic assemblies including integrated circuit (IC) packages.

BACKGROUND

Electronic circuits when commonly fabricated on a wafer of semiconductor material, such as silicon, are called ICs. The wafer with such ICs is typically cut into numerous individual dies. The dies may be packaged into an IC package containing one or more dies along with other electronic components such as resistors, capacitors, and inductors. The IC package may be integrated onto an electronic system, such as a consumer electronic system.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Overview

Figure 1A:
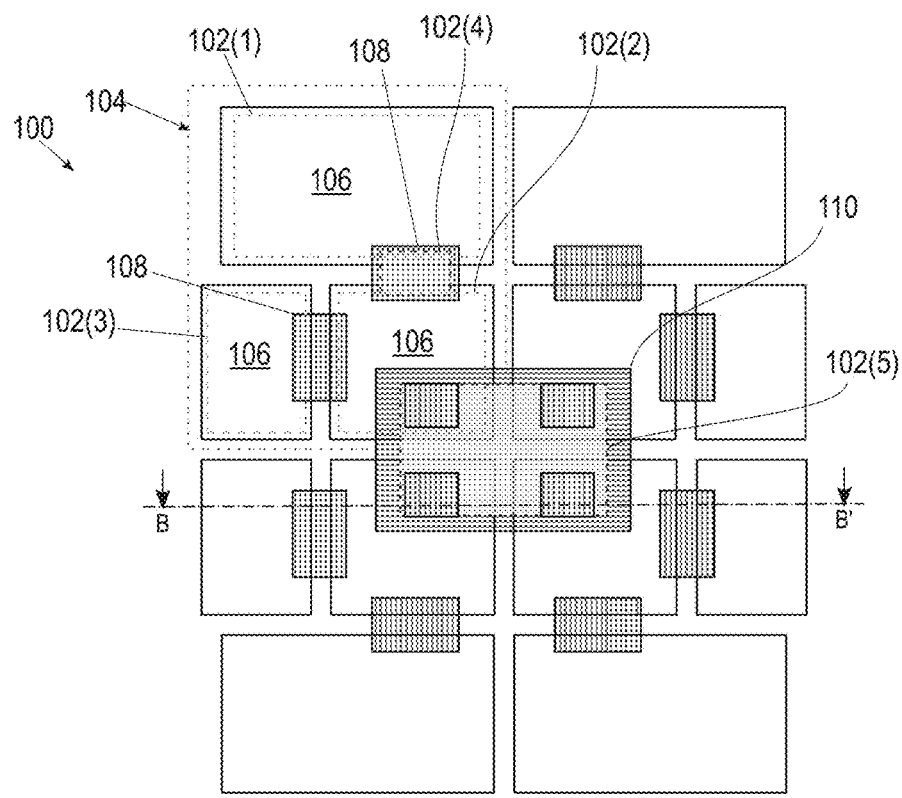
FIG. 1A is a schematic block diagram of an example microelectronic assembly, according to some embodiments of the present disclosure.

For purposes of illustrating IC packages described herein, it is important to understand phenomena that may come into play during assembly and packaging of ICs. The following foundational information may be viewed as a basis from which the present disclosure may be properly explained. Such information is offered for purposes of explanation only and, accordingly, should not be construed in any way to limit the broad scope of the present disclosure and its potential applications.

Advances in semiconductor processing and logic design have permitted an increase in the amount of logic circuits that may be included in processors and other IC devices. As a result, many processors now have multiple cores that are monolithically integrated on a single die. Generally, these types of monolithic ICs are also described as planar since they take the form of a flat surface and are typically built on a single silicon wafer made from a monocrystalline silicon boule. The typical manufacturing process for such monolithic ICs is called a planar process, allowing photolithography, etching, heat diffusion, oxidation, and other such processes to occur on the surface of the wafer, such that active circuit elements (e.g., transistors and diodes) are formed on the planar surface of the silicon wafer.

Current technologies permit hundreds and thousands of such active circuit elements to be formed on a single die so that numerous logic circuits may be enabled thereon. In such monolithic dies, the manufacturing process must be optimized for all the circuits equally, resulting in trade-offs between different circuits. In addition, because of the limitation of having to place circuits on a planar surface, some circuits are farther apart from some others, resulting in decreased performance such as longer delays. The manufacturing yield may also be severely impacted because the entire die may have to be discarded if even one circuit is malfunctional.

One solution to overcome such negative impacts of monolithic dies is to disaggregate the circuits into smaller dies (e.g., chiplets. tiles) electrically coupled by interconnect bridges. The smaller dies are part of an assembly of interconnected dies that together form a complete IC in terms of application and/or functionality, such as a memory chip, microprocessor, microcontroller, commodity IC (e.g., chip used for repetitive processing routines, simple tasks, application specific IC, etc.), and system-on-a-chip (SoC). In other words, the individual dies are connected together to create the functionalities of a monolithic IC. By using separate dies, each individual die can be designed and manufactured optimally for a particular functionality. For example, a processor core that contains logic circuits might aim for performance, and thus might require a very speed-optimized layout. This has different manufacturing requirements compared to a USB controller, which is built to meet certain USB standards, rather than for processing speed. Thus, by having different parts of the overall design separated into different dies, each one optimized in terms of design and manufacturing, the overall yield and cost of the combined die solution may be improved.

The connectivity between these dies is achievable by many different ways. For example, in 2.5D packaging solutions, a silicon interposer and through-silicon vias (TSVs) connect dies at silicon interconnect speed in a minimal footprint. In another example, called Embedded Multi-Die Interconnect Bridge (EMIB), a silicon bridge embedded under the edges of two interconnecting dies facilitates electrical coupling between them. In a three-dimensional (3D) architecture, the dies are stacked one above the other, creating a smaller footprint overall. Typically, the electrical connectivity and mechanical coupling in such 3D architecture is achieved using TSVs and high pitch solder-based bumps (e.g., C2 interconnections). The EMIB and the 3D stacked architecture may also be combined using an omnidirectional interconnect (ODI), which allows for top-packaged chips to communicate with other chips horizontally using EMIB and vertically, using Through-Mold Vias (TMVs) which are typically larger than TSVs. However, these current interconnect technologies use solder or its equivalent for connectivity, with consequent low vertical and horizontal interconnect density.

One way to mitigate low vertical interconnect density is to use an interposer, which improves vertical interconnect density but suffers from low lateral interconnect density if the base wafer of the interposer is passive. In a general sense, an "interposer" is commonly used to refer to a base piece of silicon that interconnects two dies. By including active circuitry in the interposer, lateral speeds may be improved, but it requires more expensive manufacturing processes, in particular when a large base die is used to interconnect smaller dies. Additionally, not all interfaces require fine pitch connections which may lead to additional manufacturing and processing overheads without the benefits of the fine pitch.

In one aspect of the present disclosure, an example of quasi-monolithic hierarchical integration of semiconductor dies includes recursively coupling a plurality of dies to form microelectronic assemblies of a processing system. The plurality of dies may comprise active dies and/or passive dies, and at least a portion of the plurality of dies are coupled using high-density interconnects. As used herein, "high-density interconnects" comprise die-to-die (DTD) interconnects with sub-10 micrometer pitch. In other words, the center-to-center separation between adjacent high-density interconnects is less than or equal to 10 micrometer. In one example embodiment, high-density interconnects may comprise hybrid bonds.

Each of the structures, assemblies, packages, methods, devices, and systems of the present disclosure may have several innovative aspects, no single one of which is solely responsible for all the desirable attributes disclosed herein. Details of one or more implementations of the subject matter described in this specification are set forth in the description below and the accompanying drawings.

In the following detailed description, various aspects of the illustrative implementations may be described using terms commonly employed by those skilled in the art to convey the substance of their work to others skilled in the art.

The terms "circuit" and "circuitry" mean one or more passive and/or active electrical and/or electronic components that are arranged to cooperate with one another to provide a desired function. The terms also refer to analog circuitry, digital circuitry, hard wired circuitry, programmable circuitry, microcontroller circuitry and/or any other type of physical hardware electrical and/or electronic component.

The term "integrated circuit" means a circuit that is integrated into a monolithic semiconductor or analogous material.

In some embodiments, the IC dies disclosed herein may comprise substantially monocrystalline semiconductors, such as silicon or germanium, as a base material (e.g., substrate, body) on which integrated circuits are fabricated with traditional semiconductor processing methods. The semiconductor base material may include, for example, N-type pr P-type materials. Dies may include, for example, a crystalline base material formed using a bulk silicon (or other bulk semiconductor material) or a semiconductor-on-insulator (SOI, e.g., a silicon-on-insulator) structure. In some other embodiments, the base material of one or more of the IC dies may comprise alternate materials, which may or may not be combined with silicon, that include but are not limited to germanium, indium antimonide, lead telluride, indium arsenide, indium phosphide, gallium arsenide, indium gallium arsenide, gallium antimonide, or other combinations of group III-N, group III-V, group II-VI, or group IV materials. In yet other embodiments, the base material may comprise compound semiconductors, for example, with a first sub-lattice of at least one element from group III of the periodic table (e.g., Al, Ga, In), and a second sub-lattice of at least one element of group V of the periodic table (e.g., P, As, Sb). In yet other embodiments, the base material may comprise an intrinsic IV or III-V semiconductor material or alloy, not intentionally doped with any electrically active impurity; in alternate embodiments, nominal impurity dopant levels may be present. In still other embodiments, dies may comprise a non-crystalline material, such as polymers; for example, the base material may comprise silica-filled epoxy. In other embodiments, the base material may comprise high mobility oxide semiconductor material, such as tin oxide, antimony oxide, indium oxide, indium tin oxide, titanium oxide, zinc oxide, indium zinc oxide, indium gallium zinc oxide (IGZO), gallium oxide, titanium oxynitride, ruthenium oxide, or tungsten oxide. In general, the base material may include one or more of tin oxide, cobalt oxide, copper oxide, antimony oxide, ruthenium oxide, tungsten oxide, zinc oxide, gallium oxide, titanium oxide, indium oxide, titanium oxynitride, indium tin oxide, indium zinc oxide, nickel oxide, niobium oxide, copper peroxide, IGZO, indium telluride, molybdenite, molybdenum diselenide, tungsten diselenide, tungsten disulfide, N- or P-type amorphous or polycrystalline silicon, germanium, indium gallium arsenide, silicon germanium, gallium nitride, aluminum gallium nitride, indium phosphide, and black phosphorus, each of which may possibly be doped with one or more of gallium, indium, aluminum, fluorine, boron, phosphorus, arsenic, nitrogen, tantalum, tungsten, and magnesium, etc. Although a few examples of the material for dies are described here, any material or structure that may serve as a foundation (e.g., base material) upon which IC circuits and structures as described herein may be built falls within the spirit and scope of the present disclosure.

Unless described otherwise, IC dies described herein include one or more IC structures (or, simply, "ICs") implementing (i.e., configured to perform) certain functionality. In one such example, the term "memory die" may be used to describe a die that includes one or more ICs implementing memory circuitry (e.g., ICs implementing one or more of memory devices, memory arrays, control logic configured to control the memory devices and arrays, etc.). In another such example, the term "compute die" may be used to describe a die that includes one or more ICs implementing logic/compute circuitry (e.g., ICs implementing one or more of I/O functions, arithmetic operations, pipelining of data, etc.).

In another example, the terms "package" and "IC package" are synonymous, as are the terms "die" and "IC die." Note that the terms "chip," "die," and "IC die" are used interchangeably herein.

The term "insulating" means "electrically insulating," the term "conducting" means "electrically conducting," unless otherwise specified. With reference to optical signals and/or devices, components and elements that operate on or using optical signals, the term "conducting" can also mean "optically conducting."

The terms "oxide," "carbide," "nitride," etc. refer to compounds containing, respectively, oxygen, carbon, nitrogen, etc.

The term "high-k dielectric" refers to a material having a higher dielectric constant than silicon oxide, while the term "low-k dielectric" refers to a material having a lower dielectric constant than silicon oxide.

The term "insulating material" or "insulator" (also called herein as "dielectric material" or "dielectric") refers to solid materials (and/or liquid materials that solidify after processing as described herein) that are substantially electrically nonconducting. They may include, as examples and not as limitations, organic polymers and plastics, and inorganic materials such as ionic crystals, porcelain, glass, silicon, silicon oxide, silicon carbide, silicon carbonitride, silicon nitride, and alumina or a combination thereof. They may include dielectric materials, high polarizability materials, and/or piezoelectric materials. They may be transparent or opaque without departing from the scope of the present disclosure. Further examples of insulating materials are underfills and molds or mold-like materials used in packaging applications, including for example, materials used in organic interposers, package supports and other such components.

In various embodiments, elements associated with an IC may include, for example, transistors, diodes, power sources, resistors, capacitors, inductors, sensors, transceivers, receivers, antennas, etc. In various embodiments, elements associated with an IC may include those that are monolithically integrated within an IC, mounted on an IC, or those connected to an IC. The ICs described herein may be either analog or digital and may be used in a number of applications, such as microprocessors, optoelectronics, logic blocks, audio amplifiers, etc., depending on the components associated with the IC. The ICs described herein may be employed in a single IC die or as part of a chipset for executing one or more related functions in a computer.

In various embodiments of the present disclosure, transistors described herein may be field effect transistors (FETs), e.g., metal-oxide semiconductor field effect transistors (MOSFETs). In general, a FET is a three-terminal device that includes source, drain, and gate terminals and uses electric field to control current flowing through the device. A FET typically includes a channel material, a source region and a drain regions provided in and/or over the channel material, and a gate stack that includes a gate electrode material, alternatively referred to as a "work function" material, provided over a portion of the channel material (the "channel portion") between the source and the drain regions, and optionally, also includes a gate dielectric material between the gate electrode material and the channel material.

In a general sense, an "interconnect" refers to any element that provides a physical connection between two other elements. For example, an electrical interconnect provides electrical connectivity between two electrical components, facilitating communication of electrical signals between them; an optical interconnect provides optical connectivity between two optical components, facilitating communication of optical signals between them. As used herein, both electrical interconnects and optical interconnects are comprised in the term "interconnect." The nature of the interconnect being described is to be understood herein with reference to the signal medium associated therewith. Thus, when used with reference to an electronic device, such as an IC that operates using electrical signals, the term "interconnect" describes any element formed of an electrically conductive material for providing electrical connectivity to one or more elements associated with the IC or/and between various such elements. In such cases, the term "interconnect" may refer to both conductive traces (also sometimes referred to as "lines," "wires," "metal lines" or "trenches") and conductive vias (also sometimes referred to as "vias" or "metal vias"). Sometimes, electrically conductive traces and vias may be referred to as "conductive traces" and "conductive vias", respectively, to highlight the fact that these elements include electrically conductive materials such as metals. Likewise, when used with reference to a device that operates on optical signals as well, such as a photonic IC (PIC), "interconnect" may also describe any element formed of a material that is optically conductive for providing optical connectivity to one or more elements associated with the PCI. In such cases, the term "interconnect" may refer to optical waveguides (e.g., structures that guide and confine light waves), including optical fiber, optical splitters, optical combiners, optical couplers, and optical vias.

The term "conductive trace" may be used to describe an electrically conductive element isolated by an insulating material. Within IC dies, such insulating material comprises interlayer low-k dielectric that is provided within the IC die. Within package substrates, and printed circuit boards (PCBs) such insulating material comprises organic materials such as Ajinomoto Buildup Film (ABF), polyimides, or epoxy resin. Such conductive lines are typically arranged in several levels, or several layers, of metallization stacks.

The term "conductive via" may be used to describe an electrically conductive element that interconnects two or more conductive lines of different levels of a metallization stack. To that end, a via may be provided substantially perpendicularly to the plane of an IC die/chip or a support structure over which an IC structure is provided and may interconnect two conductive lines in adjacent levels or two conductive lines in non-adjacent levels.

The term "package substrate" may be used to describe any substrate material that facilitates the packaging together of any collection of semiconductor dies and/or other electrical components such as passive electrical components. As used herein, a package substrate may be formed of any material including, but not limited to, insulating materials such as resin impregnated glass fibers (e.g., PCB or Printed Wiring Boards (PWB)), glass, ceramic, silicon, silicon carbide, etc. In addition, as used herein, a package substrate may refer to a substrate that includes buildup layers (e.g., ABF layers).

The term "metallization stack" may be used to refer to a stack of one or more interconnects for providing connectivity to different circuit components of an IC die/chip and/or a package substrate.

As used herein, the term "pitch" of interconnects refers to a center-to-center distance between adjacent interconnects.

As used herein, the term "interface" refers to a boundary, a joint, or attached surfaces of dissimilar materials.

In context of a stack of dies coupled to one another or in context of a die coupled to a package substrate, the term "interconnect" may also refer to, respectively, DTD interconnects and die-to-package substrate (DTPS) interconnects.

Although not specifically shown in all of the present illustrations in order to not clutter the drawings, when DTD or DTPS interconnects are described, a surface of a first die may include a first set of conductive contacts, and a surface of a second die or a package substrate may include a second set of conductive contacts. One or more conductive contacts of the first set may then be electrically and mechanically coupled to some of the conductive contacts of the second set by the DTD or DTPS interconnects.

In some embodiments, the pitch of the DTD interconnects may be different from the pitch of the DTPS interconnects, although, in other embodiments, these pitches may be substantially the same.

The DTPS interconnects disclosed herein may take any suitable form. In some embodiments, a set of DTPS interconnects may include solder (e.g., solder bumps or balls that are subject to a thermal reflow to form the DTPS interconnects). DTPS interconnects that include solder may include any appropriate solder material, such as lead/tin, tin/bismuth, eutectic tin/silver, ternary tin/silver/copper, eutectic tin/copper, tin/nickel/copper, tin/bismuth/copper, tin/indium/copper, tin/zinc/indium/bismuth, or other alloys. In some embodiments, a set of DTPS interconnects may include an anisotropic conductive material, such as an anisotropic conductive film or an anisotropic conductive paste. An anisotropic conductive material may include conductive materials dispersed in a non-conductive material. In some embodiments, an anisotropic conductive material may include microscopic conductive particles embedded in a binder or a thermoset adhesive film (e.g., a thermoset biphenyl-type epoxy resin, or an acrylic-based material). In some embodiments, the conductive particles may include a polymer and/or one or more metals (e.g., nickel or gold). For example, the conductive particles may include nickel-coated gold or silver-coated copper that is in turn coated with a polymer. In another example, the conductive particles may include nickel. When an anisotropic conductive material is uncompressed, there may be no conductive pathway from one side of the material to the other. However, when the anisotropic conductive material is adequately compressed (e.g., by conductive contacts on either side of the anisotropic conductive material), the conductive materials near the region of compression may contact each other so as to form a conductive pathway from one side of the film to the other in the region of compression.

The DTD interconnects disclosed herein may take any suitable form. In some embodiments, some or all of the DTD interconnects in a microelectronic assembly or an IC package as described herein may be metal-to-metal interconnects (e.g., copper-to-copper interconnects, or plated interconnects). In such embodiments, the conductive contacts on either side of the DTD interconnect may be bonded together (e.g., under elevated pressure and/or temperature) without the use of intervening solder or an anisotropic conductive material. In some metal-to-metal interconnects, a dielectric material (e.g., silicon oxide, silicon nitride, silicon carbide) may be present between the metals bonded together (e.g., between copper pads or posts that provide the associated conductive contacts). In some embodiments, one side of a DTD interconnect may include a metal pillar (e.g., a copper pillar), and the other side of the DTD interconnect may include a metal contact (e.g., a copper contact) recessed in a dielectric material. In some embodiments, a metal-to-metal interconnect (e.g., a copper-to-copper interconnect) may include a noble metal (e.g., gold) or a metal whose oxides are conductive (e.g., silver). In some embodiments, a metal-to-metal interconnect may include metal nanostructures (e.g., nanorods) that may have a reduced melting point. Metal-to-metal interconnects may be capable of reliably conducting a higher current than other types of interconnects; for example, some solder interconnects may form brittle intermetallic compounds when current flows, and the maximum current provided through such interconnects may be constrained to mitigate mechanical failure.

In some embodiments, the dies on either side of a set of DTD interconnects may be unpackaged dies.

In some embodiments, the DTD interconnects may include solder. For example, the DTD interconnects may include conductive bumps or pillars (e.g., copper bumps or pillars) attached to the respective conductive contacts by solder. In some embodiments, a thin cap of solder may be used in a metal-to-metal interconnect to accommodate planarity, and this solder may become an intermetallic compound during processing. In some embodiments, the solder used in some or all of the DTD interconnects may have a higher melting point than the solder included in some or all of the DTPS interconnects. For example, when the DTD interconnects in an IC package are formed before the DTPS interconnects are formed, solder-based DTD interconnects may use a higher-temperature solder (e.g., with a melting point above 200 degrees Celsius), while the DTPS interconnects may use a lower-temperature solder (e.g., with a melting point below 200 degrees Celsius). In some embodiments, a higher-temperature solder may include tin; tin and gold; or tin, silver, and copper (e.g., 96.5% tin, 3% silver, and 0.5% copper). In some embodiments, a lower-temperature solder may include tin and bismuth (e.g., eutectic tin bismuth), tin, silver, bismuth, indium, indium and tin, or gallium.

In some embodiments, a set of DTD interconnects may include an anisotropic conductive material, such as any of the materials discussed above for the DTPS interconnects. In some embodiments, the DTD interconnects may be used as data transfer lanes, while the DTPS interconnects may be used for power and ground lines, among others.

In microelectronic assemblies or IC packages as described herein, some or all of the DTD interconnects may have a finer pitch than the DTPS interconnects. In some embodiments, the DTPS interconnects disclosed herein may have a pitch between about 80 microns and 300 microns, while the DTD interconnects disclosed herein may have a pitch between about 0.5 microns and 100 microns, depending on the type of the DTD interconnects. An example of silicon-level interconnect density is provided by the density of some DTD interconnects. In some embodiments, the DTD interconnects may have too fine a pitch to couple to the package substrate directly (e.g., too fine to serve as DTPS interconnects). The DTD interconnects may have a smaller pitch than the DTPS interconnects due to the greater similarity of materials in the different dies on either side of a set of DTD interconnects than between a die and a package substrate on either side of a set of DTPS interconnects. In particular, the differences in the material composition of dies and package substrates may result in differential expansion and contraction of the die dies and package substrates due to heat generated during operation (as well as the heat applied during various manufacturing operations). To mitigate damage caused by this differential expansion and contraction (e.g., cracking, solder bridging, etc.), the DTPS interconnects in any of the microelectronic assemblies or IC packages as described herein may be formed larger and farther apart than DTD interconnects, which may experience less thermal stress due to the greater material similarity of the pair of dies on either side of the DTD interconnects.

It will be recognized that one more levels of underfill (e.g., organic polymer material such as benzotriazole, imidazole, polyimide, or epoxy) may be provided in an IC package described herein and may not be labeled in order to avoid cluttering the drawings. In various embodiments, the levels of underfill may comprise the same or different insulating materials. In some embodiments, the levels of underfill may comprise thermoset epoxies with silicon oxide particles; in some embodiments, the levels of underfill may comprise any suitable material that can perform underfill functions such as supporting the dies and reducing thermal stress on interconnects. In some embodiments, the choice of underfill material may be based on design considerations, such as form factor, size, stress, operating conditions, etc.; in other embodiments, the choice of underfill material may be based on material properties and processing conditions, such as cure temperature, glass transition temperature, viscosity and chemical resistance, among other factors; in some embodiments, the choice of underfill material may be based on both design and processing considerations.

In some embodiments, one or more levels of solder resist (e.g., epoxy liquid, liquid photoimageable polymers, dry film photoimageable polymers, acrylics, solvents) may be provided in an IC package described herein and may not be labeled or shown to avoid cluttering the drawings. Solder resist may be a liquid or dry film material including photoimageable polymers. In some embodiments, solder resist may be non-photoimageable.

The terms "substantially," "close," "approximately," "near," and "about," generally refer to being within +/−20% of a target value (e.g., within +/−5% or 10% of a target value) based on the context of a particular value as described herein or as known in the art.

Terms indicating orientation of various elements, e.g., "coplanar," "perpendicular," "orthogonal," "parallel," or any other angle between the elements, generally refer to being within +/−5%-20% of a target value based on the context of a particular value as described herein or as known in the art.

The term "connected" means a direct connection (which may be one or more of a mechanical, electrical, and/or thermal connection) between the things that are connected, without any intermediary devices, while the term "coupled" means either a direct connection between the things that are connected, or an indirect connection through one or more passive or active intermediary devices.

The description uses the phrases "in an embodiment" or "in embodiments," which may each refer to one or more of the same or different embodiments.

Furthermore, the terms "comprising," "including," "having," and the like, as used with respect to embodiments of the present disclosure, are synonymous.

The disclosure may use perspective-based descriptions such as "above," "below," "top," "bottom," and "side"; such descriptions are used to facilitate the discussion and are not intended to restrict the application of disclosed embodiments.

The terms "over," "under," "between," and "on" as used herein refer to a relative position of one material layer or component with respect to other layers or components. For example, one layer disposed over or under another layer may be directly in contact with the other layer or may have one or more intervening layers. Moreover, one layer disposed between two layers may be directly in contact with one or both of the two layers or may have one or more intervening layers. In contrast, a first layer described to be "on" a second layer refers to a layer that is in direct contact with that second layer. Similarly, unless explicitly stated otherwise, one feature disposed between two features may be in direct contact with the adjacent features or may have one or more intervening layers.

The term "dispose" as used herein refers to position, location, placement, and/or arrangement rather than to any particular method of formation.

The term "between," when used with reference to measurement ranges, is inclusive of the ends of the measurement ranges.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). When used herein, the notation "A/B/C" means (A), (B), and/or (C).

Although certain elements may be referred to in the singular herein, such elements may include multiple sub-elements. For example, "an electrically conductive material" may include one or more electrically conductive materials. In another example, "a dielectric material" may include one or more dielectric materials.

Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, reference is made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

The accompanying drawings are not necessarily drawn to scale.

In the drawings, same reference numerals refer to the same or analogous elements/materials shown so that, unless stated otherwise, explanations of an element/material with a given reference numeral provided in context of one of the drawings are applicable to other drawings where element/materials with the same reference numerals may be illustrated. Further, the singular and plural forms of the labels may be used with reference numerals to denote a single one and multiple ones respectively of the same or analogous type, species, or class of element.

Furthermore, in the drawings, some schematic illustrations of example structures of various devices and assemblies described herein may be shown with precise right angles and straight lines, but it is to be understood that such schematic illustrations may not reflect real-life process limitations which may cause the features to not look so "ideal" when any of the structures described herein are examined using, e.g., images of suitable characterization tools such as scanning electron microscopy (SEM) images, transmission electron microscope (TEM) images, or non-contact profilometer. In such images of real structures, possible processing and/or surface defects could also be visible, e.g., surface roughness, curvature or profile deviation, pit or scratches, not-perfectly straight edges of materials, tapered vias or other openings, inadvertent rounding of corners or variations in thicknesses of different material layers, occasional screw, edge, or combination dislocations within the crystalline region(s), and/or occasional dislocation defects of single atoms or clusters of atoms. There may be other defects not listed here but that are common within the field of device fabrication and/or packaging.

In the drawings, a particular number and arrangement of structures and components are presented for illustrative purposes and any desired number or arrangement of such structures and components may be present in various embodiments.

Further, unless otherwise specified, the structures shown in the figures may take any suitable form or shape according to material properties, fabrication processes, and operating conditions.

Figure 10:
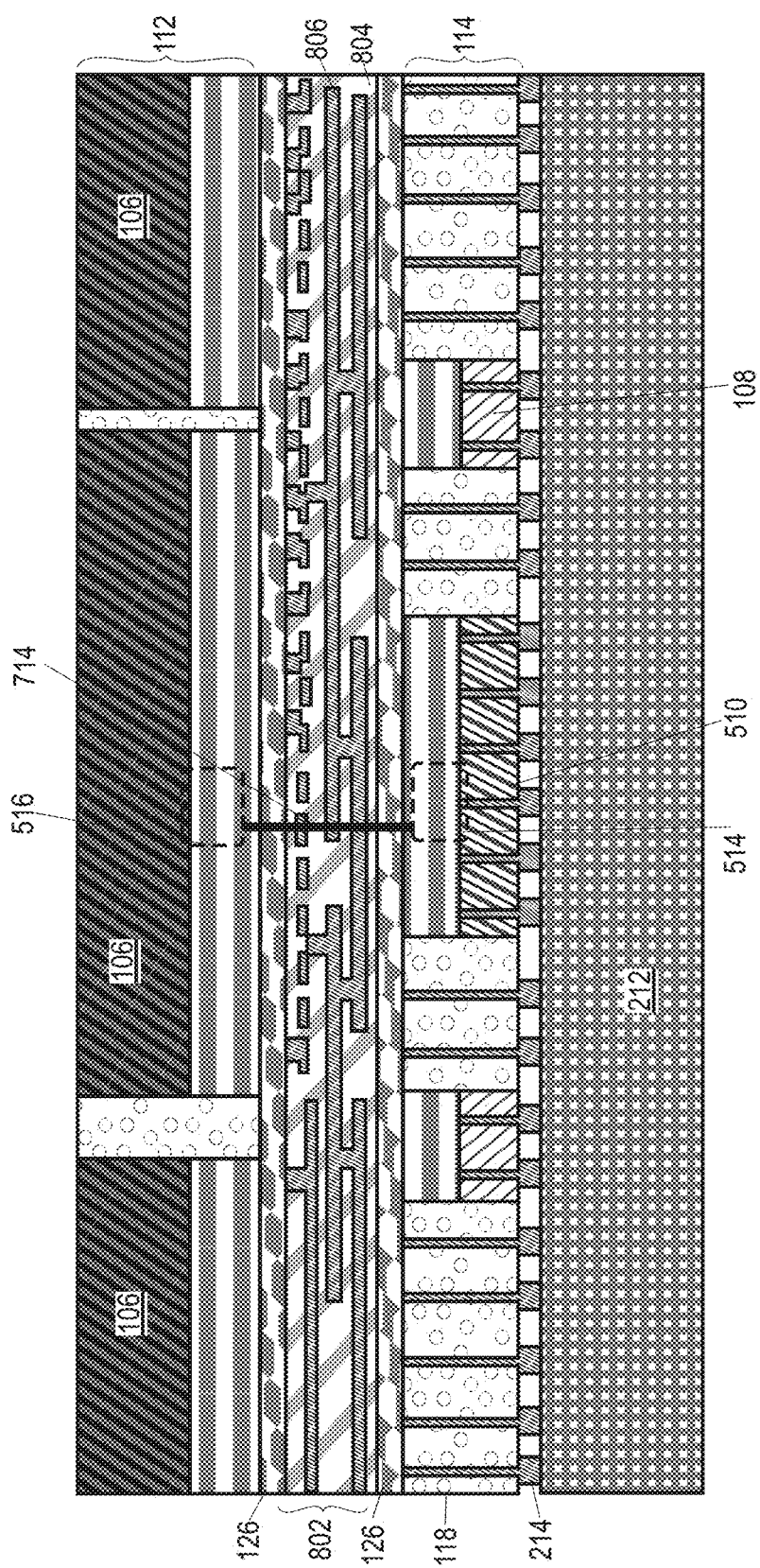
FIG. 10 is a simplified cross-sectional view of yet another example embodiment of the microelectronic assembly of FIG. 5, according to some embodiments of the present disclosure.

For convenience, if a collection of drawings designated with different letters are present (e.g., FIGS. 10A-10C), such a collection may be referred to herein without the letters (e.g., as "FIG. 10"). Similarly, if a collection of reference numerals designated with different letters are present (e.g., 112a-112e), such a collection may be referred to herein without the letters (e.g., as "112").

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Example Embodiments

FIG. 1A is a schematic top view and block diagram of a microelectronic assembly 100 according to some embodiments of the present disclosure. Microelectronic assembly 100 comprises a plurality of circuit blocks 102. As used herein, the term "circuit block" refers to an intellectual property (IP) block (also called IP core) comprising an abstract circuit (e.g., virtual circuit as opposed to a physical circuit) of a reusable unit of logic, cell, or IC layout design with a particular functionality. For example, circuit block 102(1) may comprise a set of memory registers; circuit block 102(2) may comprise an arithmetic logic unit (ALU); circuit block 102(3) may comprise a power converter; circuit block 102(4) may comprise a local interconnect block; and circuit block 102(5) may comprise a global interconnect block. A portion of the plurality of circuit blocks 102 may function together as a processing element (PE) 104 in some embodiments. PE 104 may comprise, for example, a combination of memory circuit block 102(1), ALU circuit block 102(2) and power converter circuit block 102(3), along with local interconnect circuit blocks 102(4) and global interconnect circuit block 102(5). PE 104, like circuit block 102, is a conceptual circuit (e.g., abstract circuit) as opposed to a physical one.

Embodiments of the present disclosure may facilitate composite PEs 104, which can be combined together to form a larger computing structure, which in turn may be further combined to form a larger number of cores. Local interconnect circuit blocks 102(4) may represent electrical coupling between circuit blocks in the same PE 104, such as between memory circuit block 102(1) and ALU circuit block 102(2), or between power converter circuit block 102(2) and ALU circuit block 102(2), or between different portions of ALU circuit block 102(2). Global interconnect circuit block 102(5) may represent electrical coupling between circuit block 102 in different PE 104.

The physical embodiment of circuit block 102 and PE 104 comprises IC dies 106, 108 and 110 of microelectronic assembly 100 located on at least three levels respectively: a first level 112, a second level 114, and a third level 116, in which second level 114 is in between first level 112 and third level 116. In some embodiments, one or more IC dies 106, 108 and 110 may comprise ultra-small semiconductor dies with footprint less than 10 square millimeter. In some other embodiments, one or more IC dies 106, 108 and 110 may comprise semiconductor dies of any size. In yet other embodiments, one or more IC dies 106, 108 and 110 may comprise other microelectronic assemblies, such as microelectronic assembly 100, in a recursive (e.g., nested, hierarchical) arrangement. For example, IC die 108 may comprise structures and components substantially similar to microelectronic assembly 100. In yet other embodiments, one or more IC dies 106, 108 and 110 may comprise a plurality of semiconductor dies stacked one on top of another, electrically coupled with high-density interconnects.

In some embodiments (e.g., as shown), PE 104 may be embodied as a portion of microelectronic assembly 100. In other embodiments, each PE 104 may be embodied in a separate microelectronic assembly 100. In the example embodiment shown, circuit blocks 102(1), 102(2) and 102(3) may be embodied in separate dies comprising first-level IC die 106 located at first level 112; circuit block 102(4) may be embodied in a die comprising second-level IC die 108 located at second level 114; and circuit block 102(5) may be embodied in a die comprising third-level IC die 110 located at third level 116.

Any suitable combination, layout, configuration, or arrangement of various circuit blocks 102 and PE 104 and corresponding IC dies 106, 108, and 110 may be used within the broad scope of the embodiments of the present disclosure. For example, multiple such microelectronic assemblies may be stacked within a single package. Microelectronic assembly 100 may comprise an IC, such as a microprocessor, in some embodiments. In other embodiments, microelectronic assembly 100 may form a portion (e.g., system controller block) of a larger IC, such as a microprocessor, a central processing unit (CPU), a memory device, e.g., a high-bandwidth memory device, a logic circuit, input/output circuitry, a transceiver such as a field programmable gate array transceiver, a gate array logic such as a field programmable gate array logic, of a power delivery circuitry, a III-V or a III-N device such as a III-N or III-N amplifier (e.g., GaN amplifier), Peripheral Component Interconnect Express circuitry, Double Data Rate transfer circuitry, or other electronic components known in the art.

Figure 1B:
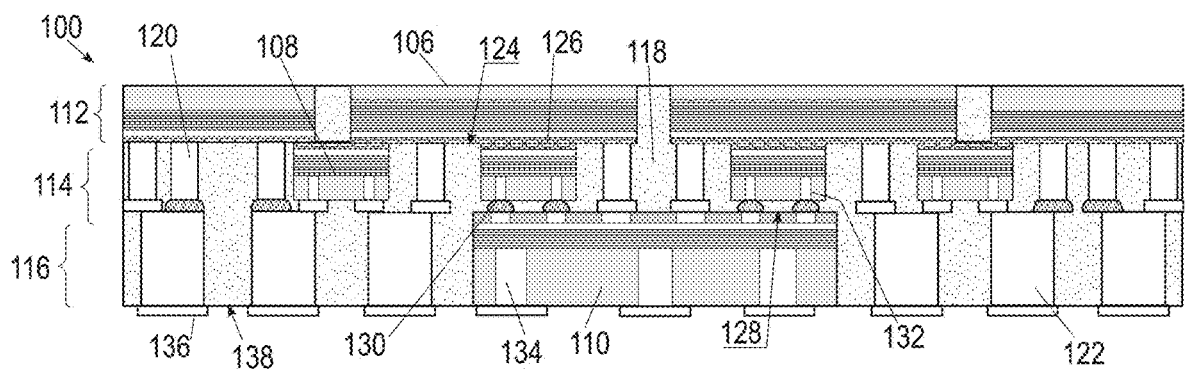
FIG. 1B is a schematic cross-sectional view of a portion of the example microelectronic assembly of FIG. 1A.

FIG. 1B is a schematic cross-section of microelectronic assembly 100 across section BB' that illustrates the three levels and embedded components more clearly. IC dies 106, 108 and 110 may be disposed in an insulator 118. Insulator 118 may comprise an inorganic dielectric material, such as silicon oxide, silicon nitride, silicon carbide, silicon oxynitride, etc.) in some embodiments; in other embodiments, insulator 118 may comprise organic materials such as mold compound, polyimide, etc. Through-dielectric vias (TDVs) 120 (e.g., also referred to as TMVs in embodiments in which insulator 118 comprises mold compound) may be disposed in insulator 118 at second level 114. TDVs 122 may be disposed in insulator 118 at third level 116. TDVs 120 and 122 may facilitate power delivery and high-speed signaling to first-level IC die 106. Interface 124 between first level 112 and second level 114 may be electrically coupled with DTD interconnects, for example, interconnects 126. In some embodiments, interconnects 126 may comprise hybrid bond interconnects. Interface 128 between second level 114 and third level 116 may be electrically coupled with interconnects 130.

In some embodiments, the pitch of interconnects 130 may be smaller than the pitch of interconnects 126. In various embodiments, interconnects 130 may comprise hybrid bonds (e.g., comprising metal-to-metal and dielectric-to-dielectric bonds, the process of forming such bonds being referred to herein as "hybrid bonding"), micro-bumps, copper pillar interconnects, or flip-chip interconnects. Second-level IC die 108 may comprise TSVs 132 and third-level IC die 110 may comprise TSVs 134 in some embodiments. In other embodiments, TSVs may be absent in one or both of second-level IC die 108 and third-level IC die 110. Bond pads 136 at a bottom surface 138 of third level 116 may facilitate electrically coupling microelectronic assembly 100 to other components, such as a package substrate, or to other microelectronic assemblies.

Figure 1C:
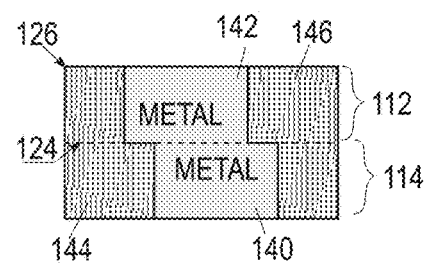
FIG. 1C is a schematic cross-sectional view of a hybrid bond in the example microelectronic assembly of FIG. 1A.

FIG. 1C shows an individual one of an example embodiment of interconnects 126 comprising hybrid bonds in greater detail. Note that although one of interconnects 126 is shown, the same structure and description may apply to any other interconnects (e.g., 130) comprising hybrid bonds in microelectronic assembly 100. At interface 124 between first level 112 and second level 114, conductive contact 140 belonging to second level 114 may bond with conductive contact 142 of first level 112; likewise, dielectric material 144 (e.g., silicon oxide, silicon nitride, silicon oxynitride, etc.) in second level 114 may bond with dielectric 146 in first level 112. The bonded connections form interconnects 126, comprising hybrid bonds, providing electrical and mechanical coupling between first level 112 and second level 114.

Note that FIGS. 1A-1C are intended to show relative arrangements of the components within their assemblies, and that, in general, such assemblies may include other components that are not illustrated (e.g., various interfacial layers or various other components related to optical functionality, electrical connectivity, or thermal mitigation). For example, in some further embodiments, the assembly as shown in FIGS. 1A-1B may include multiple dies and/or XPUs along with other electrical components.

Additionally, although some components of the assemblies are illustrated in FIGS. 1A-1B as being planar rectangles or formed of rectangular solids, this is simply for ease of illustration, and embodiments of these assemblies may be curved, rounded, or otherwise irregularly shaped as dictated by and sometimes inevitable due to the manufacturing processes used to fabricate various components.

Figure 2:
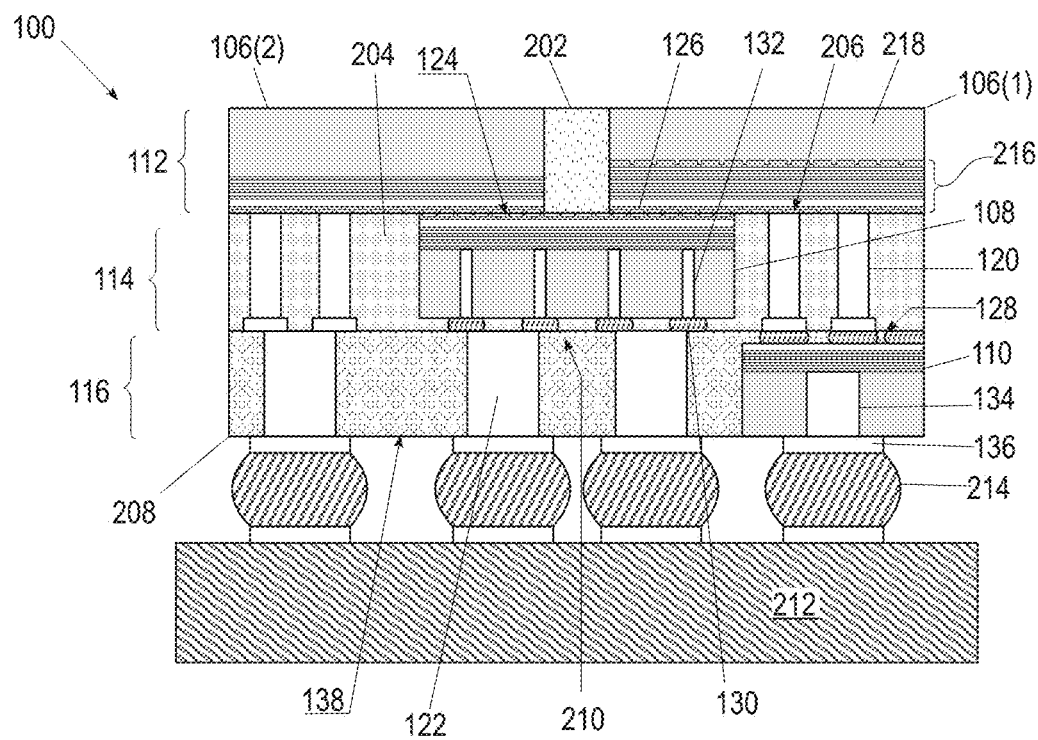
FIG. 2 is a schematic cross-sectional view of an example IC packaging architecture comprising a microelectronic assembly, according to some embodiments of the present disclosure.

FIG. 2 is a schematic cross-sectional illustration of a microelectronic assembly 100, according to some embodiments of the present disclosure. Microelectronic assembly 100 comprises at least three levels: first level 112, second level 114, and third level 116. First level 112 comprises one or more first-level IC die 106, for example, 106(1) and 106(2) in the example shown, and an insulator 202. First-level IC die 106 may or may not include TSVs. Second level 114 comprises one or more second-level IC die 108 surrounded by an insulator 204, through which are disposed one or more conductive TDVs 120 (e.g., TMVs). Insulator 204 may comprise the same material as insulator 202 or insulator 118 in some embodiments; in other embodiments, insulator 204 may comprise a different material. Second-level IC die 108 may include TSVs 132. Interface 124 between first level 112 and second level 114 may be electrically and mechanically coupled with interconnects 126 having a minimum pitch 206. In an example embodiment, pitch 206 may be approximately 2 micrometers (microns) or smaller. In other example embodiments, pitch 206 may be approximately 2 micrometers or larger.

Third level 116 may comprise one or more third-level IC die 110, which may comprise TSVs 134. Third-level IC die 110 may be surrounded by an insulator 208, in which TDVs 122 are disposed. Insulator 208 may comprise the same material as insulator 204 of first level 112 or insulator 204 of second level 114 in some embodiments; in other embodiments, insulator 204 may comprise a different material than either. Interface 128 between second level 114 and third level 116 may be electrically and mechanically coupled with interconnects 130 having a minimum pitch 210. In an example embodiment, pitch 210 may be 10 micrometers. In some embodiments, interconnects 130 may comprise hybrid bonds; in other embodiments, interconnects 130 may comprise other forms of DTD interconnects (e.g., micro-bumps, copper pillar interconnects, or flip-chip interconnects). In various embodiments, third level 116 may be electrically and mechanically coupled to a package substrate 212 with interconnects 214.

In some embodiments, package substrate 212 may comprise a PCB comprising multiple layers of conductive traces embedded in organic dielectric material. For example, package substrate 212 may comprise a laminate substrate with several layers of metal planes or traces that are interconnected to each other by through-hole plated vias, with input/output routing planes on the top and bottom layers, while the inner layers are used as a ground and power plane. In other embodiments, package substrate 212 may comprise an organic interposer; in yet other embodiments, package substrate may comprise an inorganic interposer (e.g., made of glass, ceramic or semiconductor materials). In yet other embodiments, package substrate 212 may comprise a composite of organic and inorganic materials, for example, with an embedded semiconductor die in an organic substrate. In some embodiments, interconnects 214 may comprise DTPS interconnects; in other embodiments, for example, where package substrate 212 comprises a semiconductor interconnect bridge, interconnects 214 may comprise DTD interconnects.

In some embodiments, any of insulators 202, 204 and 208 may include a dielectric material, such as silicon dioxide, silicon carbon nitride, silicon nitride, oxynitride, polyimide materials, glass reinforced epoxy matrix materials, organic materials such as silica-filled epoxy, or a low-k or ultra-low-k dielectric (e.g., carbon-doped dielectrics, fluorine-doped dielectrics, porous dielectrics, organic polymeric dielectrics, photo-imageable dielectrics, and/or benzocyclobutene-based polymers). In some embodiments any of insulators 202, 204 and 208 may include a semiconductor material, such as silicon, germanium, or a III-V material (e.g., gallium nitride), and one or more additional materials.

In an example embodiment one or more IC dies 106, 108 and 110 comprise a semiconductor die having a metallization stack 216 with a plurality of electrically conductive interconnects such as metal lines and vias extending through an insulator material fabricated using known semiconductor manufacturing processes. In some embodiments, one or more IC dies 106, 108 and 110 may comprise a semiconductor die with a substrate 218 including substantially monocrystalline semiconductors and/or other materials as already described.

Although not specifically shown in all of the present illustrations in order to not clutter the drawings, any interface (e.g., 124, 128) between two levels, a first level and a second level, described herein includes two surfaces: a first surface of the first level in contact with a second surface of the second level.

In various embodiments, minimum pitch 206 at interface 124 between first level 112 and second level 114 may be less than or equal to 10 micrometers; minimum pitch 210 at interface 128 between second level 114 and third level 116 may be greater than 10 micrometers and less than 100 micrometers; the minimum pitch at the interface between third level 116 and package substrate 212 may be more than 80 micrometers, resulting in hierarchical pitches from finer pitches at first level 112 to increasingly coarser pitches at third level 116. Consequently, the pitch of TDVs 120 in second level 114 may be less than the pitch of TDVs 122 in third level 116. Likewise, the minimum pitch of TSVs 132 in second-level IC die 108 may be less than the minimum pitch of TSVs 134 in third-level IC die 110 in some embodiments. In other embodiments, various interconnects between adjacent layers may comprise the same type of interconnect (e.g., hybrid bonds) having substantially similar pitch of less than 2 micrometers between adjacent ones of the interconnects.

An architecture encompassing hierarchical pitches allows dies of disparate manufacturing technologies (e.g., technology node, or process node, or simply node) to be coupled together seamlessly within microelectronic assembly 100. In a general sense, different nodes often imply different circuit generations and architectures. Smaller (or more recent) the technology node, smaller are the feature sizes, and consequently, the resulting transistors are both faster and more power-efficient. For example, microelectronic assembly 100 may include first-level IC die 106 manufactured using 10 nm process, second-level IC die 108 manufactured using 22 nm process and third-level IC die 110 manufactured using 45 nm process.

In various embodiments, IC dies 106, 108 and 110 may comprise ultra-small dies. In some embodiments, only first-level IC die 106 may comprise such ultra-small dies, while second-level IC die 106 and third-level IC die 110 may be of larger dimensions. In some embodiments, first-level IC die 106 may comprise single-side connections as depicted in the figure. In some embodiments, second-level IC die 108 may be passive and may facilitate electrical coupling between first-level IC die 106, for example, between first-level IC dies 106(1) and 106(2). In some embodiments, second-level IC die 108 may further comprise active circuit elements, for example, to provide additional networking functionalities. Likewise, third-level IC die 110 may be passive and may merely facilitate electrical coupling with second-level IC die 108, or with first-level IC die 106 in some embodiments. In other embodiments, third-level IC die 110 may comprise active circuit elements as well. Second-level IC die 108 and third-level IC die 110 may comprise double-side connections, for example, at two opposing interfaces between levels. In various embodiments, TDVs 120 in second level 114 and TDVs 122 in third level 116 may facilitate power delivery, high-speed signaling or across layer connections.

In various embodiments, selection of materials for insulators 202, 204 and 208 may be appropriately based on recursive re-implementation and hierarchical coupling of microelectronic assembly 100. Interconnects may also be hierarchically described: local within a single die, intermediate between dies in a microelectronic assembly, and global between hierarchical microelectronic assemblies. Such a quasi-monolithic hierarchical integration architecture allows process optimization for each individual circuit block 102. Where previously such circuit blocks 102 were incorporated into one large monolithic semiconductor die, embodiments of the present disclosure allow individual circuit blocks 102 to be implemented in individual dies using processing technology suitable for the functionality and/or design of circuit block 102, enabling much better yield and manufacturing improvements compared to global process node improvements. Embodiments of the present disclosure facilitate better reuse and configurability of CPUs and other processors and provide higher granularity/customizability in process selection and interconnect routing.

This architecture is particularly useful for multi-core architectures, where composite PEs 104 may be formed using two levels of dies which may then be combined together to form a larger computing structure. The larger computing structure may be further combined to form a larger number of cores. Some of PEs 104 may include non-Boolean logic dies with one or more of the neighboring dies serving as electrical/logical interconnect to the memory/external system. One particular flexibility in the structure may be the ability to vertically stack the different dies to improve functionality. For example, memory dies may be stacked one on top of another to increase capacity. In another example, ALUs implemented in individual dies may be stacked one on top of another for improved throughput if the thermal solution can handle the increased power densities of the stacked ALUs. The microelectronic assemblies as described herein may help to reduce the cost and improve line utilization if the interconnect density between the microelectronic assemblies may be satisfied with lower density interconnects. The arrangements as disclosed in the various embodiments described herein can also allow interoperability with devices from other manufacturers or other accelerators.

Figure 3:
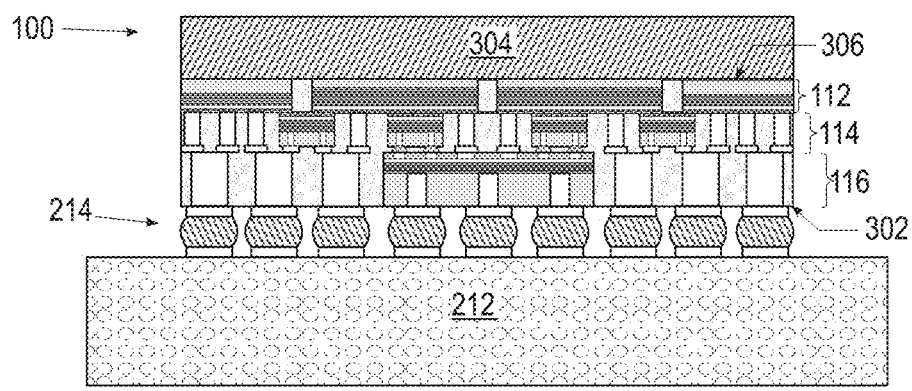
FIG. 3 is a schematic cross-sectional view of another example IC packaging architecture, according to some embodiments of the present disclosure.

FIG. 3 is a simplified cross-sectional view of a microelectronic assembly 100 comprising three levels: first level 112, second level 114 and third level 116. Microelectronic assembly 100 may be coupled to package substrate 212 with interconnects 214 on surface 302. In some embodiments, microelectronic assembly 100 may be coupled to a stiffener 304 on a surface 306 opposite to surface 302. In some embodiments, stiffener 304 may comprise silicon; in other embodiments, stiffener 304 may comprise a ceramic material; in yet other embodiments, stiffener 304 may comprise a metal; in yet other embodiments, stiffener 304 may comprise a hard plastic. Any suitable material that can provide mechanical strength may be used. In some embodiments, stiffener 304 may also function as a heat sink.

Figure 4A:
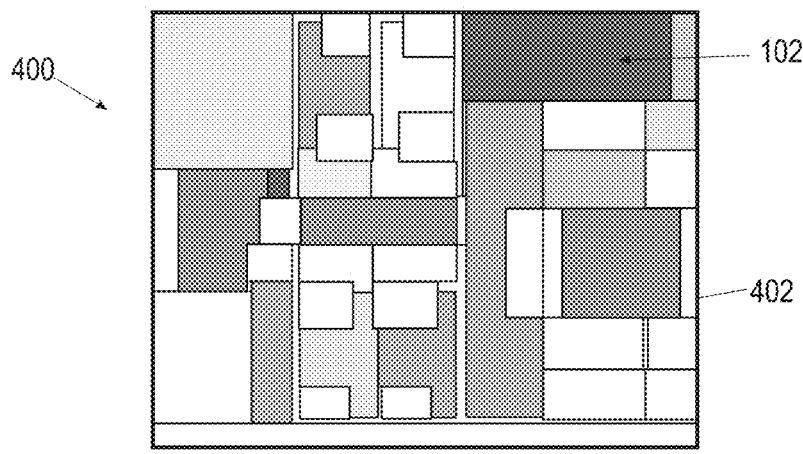
FIGS. 4A-4C are schematic block diagrams of yet another example IC packaging architecture, according to some embodiments of the present disclosure.
Figure 4B:
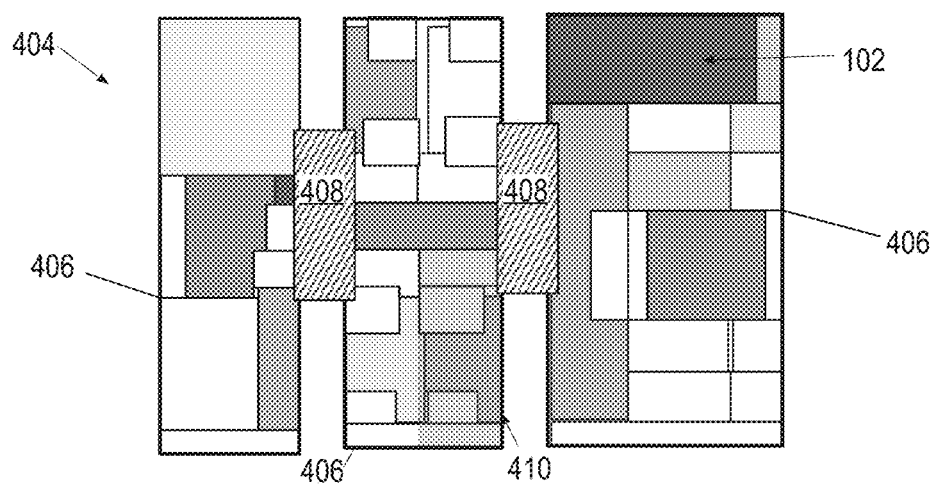
Figure 4C:
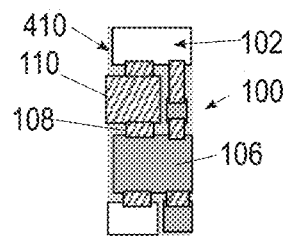

FIGS. 4A-4C are simplified top-views of different forms of an IC 400. FIG. 4A represents IC 400 embodied in a monolithic form 402. In monolithic form 402, all circuit blocks 102 that contribute to the functionality of IC 400 are embodied in a single wafer. FIG. 4B represents the same IC 400 embodied in a multi-chip module 404, wherein some circuit blocks 102 are embodied in separate dies 406 and interconnected using die bridges 408. FIG. 4C represents a portion 410 of multi-chip module 404, embodied as a microelectronic assembly 100 having IC dies 106, 108, and 110 at three levels according to embodiments of the present disclosure, each IC die comprising a separate circuit block 102. In various embodiments, one or more IC dies 106, 108, and 110 may be manufactured using one process node, and other IC dies 106, 108, and 110 may be manufactured using another process node. Process nodes may be differentiated by structural features in microelectronic assembly 100; for example, a digital circuit optimized process node may comprise transistors of smaller size than another process node optimized for analog circuits. In another example, a first process node may result in transistors having thicker gates and higher breakdown voltage than transistors manufactured using a second process node. Various other structural dissimilarities may be evident between two IC dies manufactured using correspondingly disparate process nodes.

Figure 5:
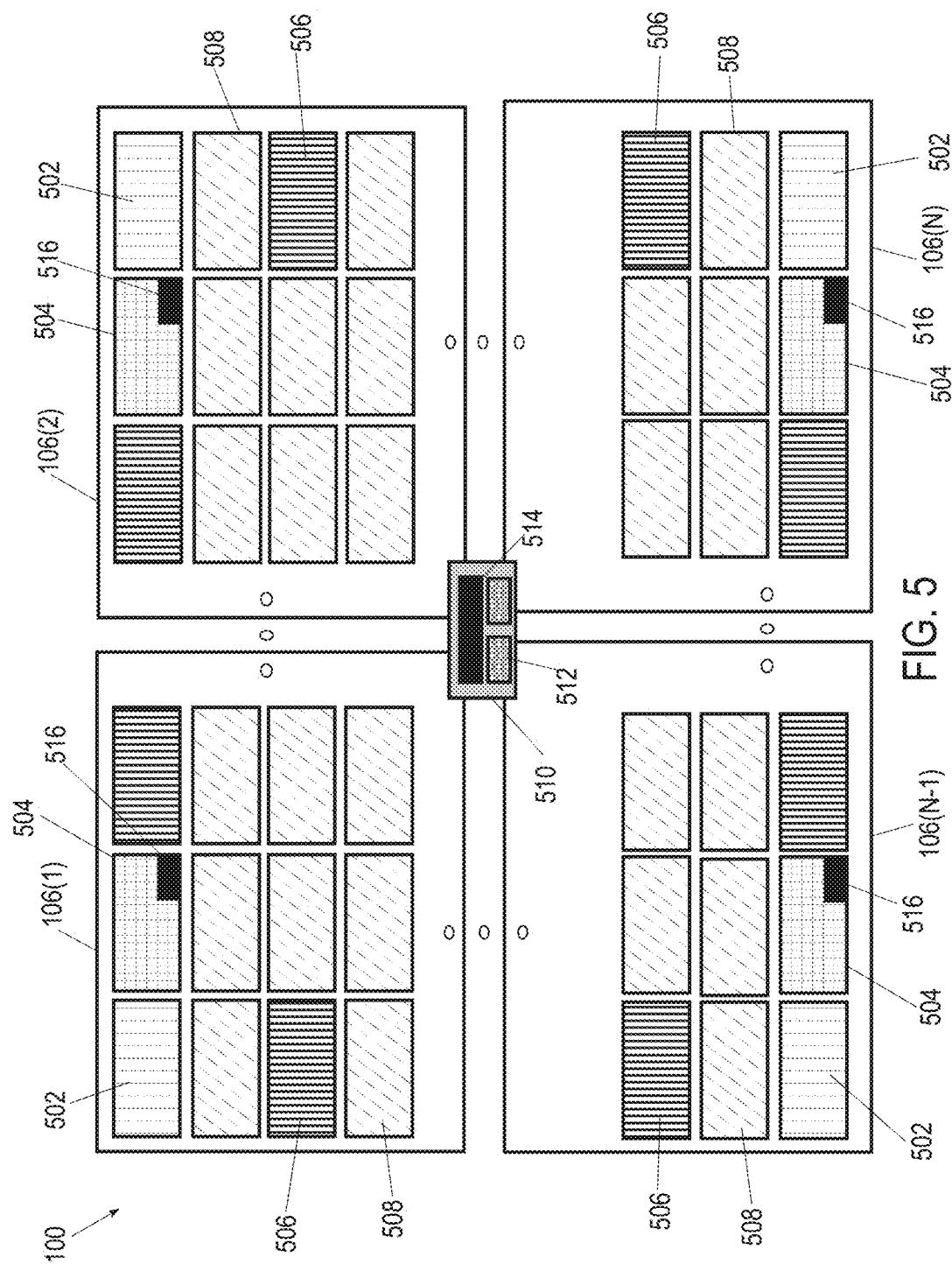
FIG. 5 is a block diagram of an example microelectronic assembly for disaggregated entropy services, according to some embodiments of the present disclosure.

FIG. 5 is a simplified block diagram illustrating an example embodiment of microelectronic assembly 100. Microelectronic assembly 100 may comprise a plurality of IC dies 106 (e.g., 106(1), 106(2), ... 106(N)) Each IC die 106 may comprise a plurality of IP blocks that may be the same or different from IP blocks in other IC dies 106. In some embodiments, each such IP block may comprise a separate IC die coupled using hybrid bonds or other forms of DTD interconnects to IC die 106. Examples of IP blocks in IC dies 106(1)-(N) include a utility box (ubox) 502 (e.g., that controls register accesses, interrupt flows, lock flows and events); hybrid cloud extension (HCX) block 504 that offloads workloads across a network to a server or cloud in a remote location; input/output (IO) block 506; and cache (e.g., memory) 508. Various other IP blocks may be present in each of IC dies 106 within the broad scope of the embodiments.

In various embodiments, each IC die 106 may be electrically coupled by an interconnect bus (not shown) to IC die 510 (also called herein as security IC die 510), comprising security circuits. Security circuits may operate to provide entropy services, including security functions such as encryption and decryption of information, generation and distribution of secure cryptographic keys, and/or functioning as an entropy source for security functions executing in other IC dies, such as IC die 106. They may also include sensing or monitoring of environmental conditions such as input voltages, clock frequencies, or temperature in order to detect attempts to perform invasive or non-invasive attacks against the overall security of the system. In some embodiments, the security circuits may include at least one digital random number generator (DRNG) 512. DRNG 512 may be used to generate random numbers for filesystem-in-userspace (FUSE) encryption, cryptographic keys, and other such uses. IC die 510 may further include at least one PUF circuit 514 that may be used to encrypt the random number sequence generated by DRNG 512 and to communicate the encrypted information in a trusted manner with a counterpart PUF circuit 516 present in HCX block 504 (or elsewhere) in each IC die 106. A PUF as used herein refers to a circuit that exploits manufacturing variations to derive a unique digital identifier (e.g., security key); it is a physical entity embodied in a physical structure that, for a given input condition, provides a physically defined output that serves as a unique identifier for the physical structure in which the PUF is embodied, e.g., in a semiconductor device.

In a general sense, DRNG 512 and PUF circuits 514 and 516 can be used to harvest dynamic and static entropy respectively. Static entropy (e.g., as in PUF) manifests in the form of a unique response (e.g., identifier) that can be repeatedly created with high accuracy for every device instance and can be reliably used for chip identification and root of trust. This is accomplished by exploiting manufacturing induced variation with circuits/techniques that enhance/reinforce such spatial instance specific random mismatch and suppress temporal variability (e.g., thermal noise). Dynamic entropy circuits (e.g., DRNG) on the other hand, subdue spatial process/manufacturing induced variation to amplify the influence of temporal random sources of variation. For example, DRNG 512 generates a dynamically variant random number sequence (e.g., that varies each time it is generated), which is then encrypted using the static, secure, trusted key generated by PUF circuit 514, and communicated to PUF circuit 516 in IC die 106, which can decrypt the communicated data and extract the generated random number sequence for further processing.

In various embodiments, DRNG 512 is an electronic circuit (e.g., digital circuit) that produces a sequence of random numbers (and/or random bits) for various security purposes. In general, the random numbers are generated on an interval (e.g., between a minimum (min) and a maximum (max), in a range [min, max]) such that values appear unpredictable. The output of DRNG 512 is a random sequence (or simply "sequence") and it may comprise random numbers and/or random bits. The random sequence may be independent (e.g., each new value in the random sequence is statistically independent of the previous value), uniformly distributed (e.g., any number has a uniform probability of appearing in the random sequence), and unpredictable (e.g., an attacker such as hacking software, hostile software, software instructions/commands to hack, snoop, etc. may not be able to guess some or all of the values in the random sequence).

In a general sense, random numbers may be generated using a pseudo-random number generator (PRNG) algorithm or a true random number generator (TRNG) algorithm. The PRNG is a deterministic algorithm that computes a sequence of numbers that "look" random. The PRNG algorithm requires a seed value that is used to initialize the state of the underlying model. Once seeded, it can then generate a sequence of numbers that exhibit good statistical behavior (e.g., independence, uniform distribution) but may be deterministic and exhibit periodicity that depends on the size of its internal state model (e.g., after generating a long random sequence of numbers, all variations in internal state will be exhausted and the next sequence of numbers to follow will repeat an earlier sequence; for example, the Mersenne Twister MT19937 PRNG with 32-bit word length has a periodicity of $2^{19937}-1$).

In contrast to the PRNG algorithm, the TRNG algorithm extracts randomness (also called entropy) from a physical source of some type and then uses it to generate random numbers. The physical source is also referred to as an "entropy source" and can be selected among a wide variety of physical phenomenon naturally available, or made available, to the computing system (e.g., time between user key strokes, mouse movements, etc.). Unlike the PRNG algorithm, the TRNG algorithm need not be seeded, and its selection of random values in any given random sequence is highly unpredictable. As such, an attacker cannot use observations of a particular random number sequence to predict subsequent values in an effective way. This property also implies that outputs from TRNG circuit have no periodicity. While repeats in random sequence are possible (although unlikely), they cannot be predicted in a manner useful to an attacker. The TRNG algorithm can be more computationally time consuming or otherwise more expensive than the PRNG algorithm.

A further approach used in modern operating systems and cryptographic libraries is to take input from an entropy source to supply a buffer or pool of entropy. The entropy pool is then used to provide nondeterministic random numbers that periodically seed a cryptographically secure PRNG (CSPRNG) algorithm. This CSPRNG algorithm provides cryptographically secure random numbers that appear truly random and exhibit a well-defined level of computational attack resistance.

In various embodiments, DRNG 512 facilitates high-quality, high-performance entropy and random number generation in hardware. In various embodiments, DRNG 512 uses an entropy source (ES) to repeatedly seed a hardware-implemented CSPRNG algorithm (i.e., an algorithm that runs on dedicated circuitry). Unlike software approaches, it includes a high-quality entropy source implementation that can be sampled quickly to repeatedly seed the CSPRNG with high-quality entropy. Furthermore, it represents a self-contained hardware module that is isolated from software attacks on its internal state. The random sequence output from DRNG 512 has high statistical quality (independence, uniform distribution), high unpredictability, high performance, and protection against attack. DRNG 512 is unique in its approach to true random number generation in that it is implemented in hardware (e.g., as a dedicated circuit) as opposed to conventional algorithmic approaches in software. Software running at all privilege levels in microelectronic assembly 100 can access random numbers generated by DRNG 512 through a common instruction set, bypassing intermediate software stacks, libraries, or operating system handling.

In conventional applications that do not use embodiments of microelectronic assembly 100, each die in a microelectronic assembly may include several DRNGs, some of which may be inactive (e.g., dormant, temporarily unused, etc.). In general, any IC die that includes a DRNG must be certified separately for the applicable security standards, which can be a costly endeavor. Additionally, in certain embodiments, the DRNG includes analog hardware IP (HIP) block functioning as an ES, which is subject to performance variation across process, voltage, and temperature (PVT). Each additional copy of DRNG in the IC die increases the probability of failure of the ES to meet the standards set by National Institute of Standards and Technology (NIST) (or other standards organizations), which negatively impacts yield. Moreover, post-silicon test time increases linearly with the number of DRNGs included in the microelectronic assembly. Still further, DRNGs integrated into individual IC dies cause legacy requirements that may make it difficult to adapt product families to improved versions of DRNG, which is critical to mitigate emerging threats and/or to respond to post-silicon learning.

In accordance with features of embodiments described herein, entropy production is moved in microelectronic assembly 100 from each individual IC die 106 to a separate IC die 510. This may be accomplished by leveraging secure within-package communication enabled by PUF circuit 514 provided on IC dies 510 and 106. The random numbers generated by DRNGs 512 may be encrypted with PUF circuit 514 and distributed to IC dies 106 in microelectronic assembly 100. The random numbers may be used appropriately by the receiving IC die 106 for various purposes, for example, to generate keys for virtual machines, FUSE, and other cryptographic needs. Thus, security functions that were previously performed on individual IC dies 106 may be offloaded into security IC die 510, with encrypted die-to-die communication therebetween to preserve security. Security IC die 510 may enable simultaneous generation of high-entropy chip-identifiers (IDs) and encryption keys in real time.

Figure 6A:
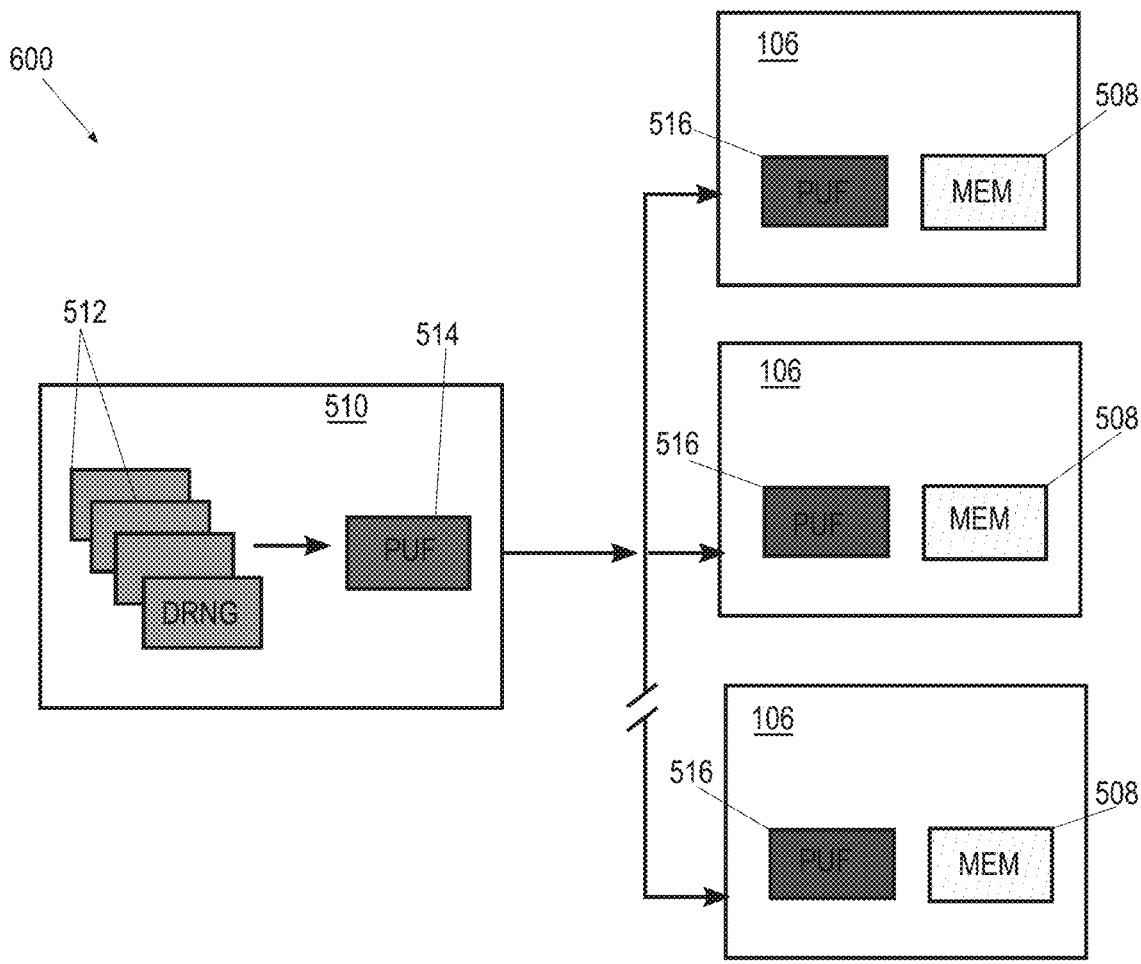
FIG. 6A is a block diagram of an architecture for disaggregated entropy services in the example microelectronic assembly of FIG. 5, according to some embodiments of the present disclosure.

FIG. 6A is a simplified block diagram illustrating an example architecture 600 of disaggregated entropy services in microelectronic assembly 100. PUF circuits 514 and 516 may be used to create keys that are generated on-demand. Conventionally, an input or stimulus that is accepted by a PUF (whether embodied in hardware as in microelectronic assembly 100 or in software) is called a "challenge." The output of the PUF after interaction with the stimulus is called a "response." A pair comprising a challenge and the corresponding response is called a challenge-response pair. The output of a particular PUF for an input can only be obtained using the particular physical system underlying the particular PUF. Possession of a challenge-response pair by a device is proof that at some point the challenge was offered to the unique physical system that underlies the PUF.

Thus, the responses from PUF circuits 514 and 516 are dependent on random physical factors that are unpredictable and uncontrollable and that exist natively and/or are incidentally introduced during a manufacturing process, making it virtually impossible to duplicate or clone. Physical factors that influence PUF behavior are physical structure and electrical characteristics, including doping concentrations, oxide thickness, channel lengths, structural width (e.g., of a metal layer), threshold voltages, and parasitics (e.g., resistance, capacitance). PUF circuit 514 generates a digital fingerprint for its associated security IC die 510, which can be utilized as a unique key to support cryptographic algorithms and services including encryption/decryption, authentication, and digital signature. Likewise, each one of PUF circuits 516 generate a corresponding key for the respective IC die 106 in which it is located. The PUF-generated key may be used to build a secure vault within the on-chip nonvolatile memory 508. In various embodiments, each IC die 106 may be identified by a unique PUF identifier (ID) and cryptographic key generated by respective PUF circuit 516 and stored in memory 508.

In various embodiments, PUF circuit 514 may store a list of identifying information of the authorized devices corresponding to the different IC dies 106 and/or PUF circuits 516 authorized to communicate with IC die 510. Corresponding PUF circuits 516 may store identifying information of IC die 510 and/or PUF circuit 514. In other words, IC dies 106 may constitute authorized devices for IC die 510; whereas IC die 510 may constitute an authorized device for any one of IC die 106. In some embodiments, the identifying information comprising the PUF ID may be stored in encrypted form in the corresponding IC die (e.g., 510, 106) using the cryptographic key together with a challenge code and access code derived from a combination of the cryptographic key and the respective PUF response for the authorized device. The challenge code is used by the PUF circuit to generate a PUF response and this response is used, together with the access code, to reconstruct the cryptographic key in future communications between the IC die and the authorized device.

Note that any suitable scheme to ensure the security of the identifying information of authorized devices using PUF circuits may be used in microelectronic assembly 100 within the broad scope of the embodiments.

In an example embodiment, the cryptographic key generated by PUF circuit 514 in IC die 510 or by PUF circuit 516 in IC die 106 may comprise 64 bits. In another example embodiment, the cryptographic key may comprise 128 bits. Any number of bits may be included in the cryptographic keys within the broad scope of the embodiments. Each cryptographic key is independent of other cryptographic keys and are stable across voltage, temperature and time. An example PUF circuit 514 or 516 may utilize ring oscillators to generate the cryptographic key and/or PUF ID. The value of the cryptographic key is dependent on the physical structure and electrical characteristics of the ring oscillators used to generate the key. In various embodiments, any security feature (not only DRNGs) may be implemented with PUF circuits 514 and 516 as shown within the broad scope of the embodiments.

In various embodiments, during operation, a particular IC die 106 may request for entropy (e.g., request a random number or random seed) from DRNG 512. DRNG 512 may generate the random number or random seed accordingly. PUF circuit 514 may encrypt the generated output and communicate it to the particular IC die 106 which sent the initial request using the cryptographic key and PUF ID to authenticate the particular IC die 106, thereby ensuring that communication between the particular IC die 106 and security IC die 510 is encrypted, secure, and tamper-proof. The latency of this encrypted inter-die communication is minimized by the presence of interconnects 126 comprising hybrid bonds in the conductive pathway between IC dies 510 and 106 to levels comparable to intra-die communication within a single monolithic chip.

Figure 6B:
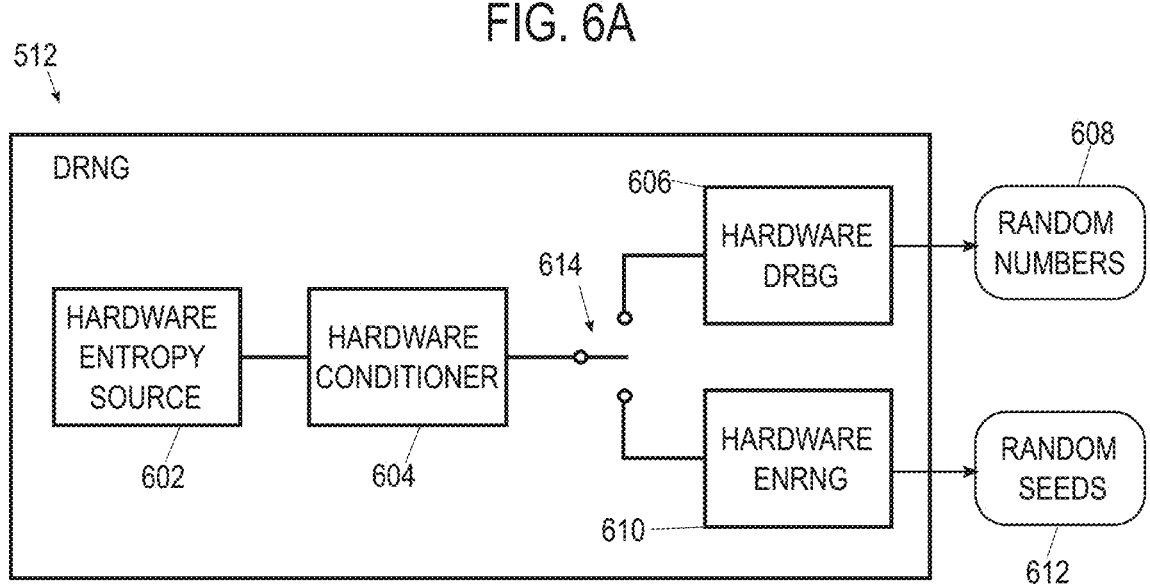
FIG. 6B is a block diagram of a digital random number generator in the example microelectronic assembly of FIG. 5, according to some embodiments of the present disclosure.

FIG. 6B is a simplified block diagram of an example embodiment of DRNG 512 in microelectronic assembly 100. In a general sense, DRNG 512 comprises three logical components forming an asynchronous production pipeline: a hardware ES 602 also known as a nondeterministic random bit generator (NRBG), which is a circuit that produces random bits from a nondeterministic hardware process (e.g., at around 3 Gbps), a hardware conditioner 604, which is a circuit that uses advanced encryption standard (AES) algorithm in cipher block chaining message authentication code (CBC-MAC) mode to distill the entropy into high-quality nondeterministic random numbers, and two parallel outputs: a deterministic random bit generator (DRBG) 606, which is a circuit that generates random numbers seeded from hardware conditioner 604; and an enhanced, nondeterministic random number generator (ENRNG) 610, which is a circuit that provides random seeds 612 from hardware conditioner 604. The pathway functions similar to an alternating switch 614, with one output (e.g., seed) from hardware conditioner 604 going to the DRBG 606 and the next output (e.g., seed) going to ENRNG 610.

Hardware entropy source 602 provides a serial stream of entropic data (e.g., random data) in the form of zeros and ones. For example, hardware entropy source 602 runs asynchronously on a self-timed circuit and uses thermal noise within the silicon to output a random stream of bits at the rate of 3 GHz. Hardware conditioner 604 takes pairs of 256-bit raw entropy samples generated by hardware ES 602 and reduces them to a single 256-bit conditioned entropy sample, effectively distilling the entropy into more concentrated samples. Hardware DRBG 606 spreads the conditioned entropy sample from hardware conditioner 604 into a large set of random values, generating a sequence of random numbers 608 by using a standards-compliant DRBG algorithm and continuously reseeding it with the conditioned entropy samples from hardware conditioner 604. The effective output from hardware conditioner 604 and hardware DRBG 606 may be equivalent to that of a CSPRNG algorithm. Hardware ENRNG 610 converts the conditioned entropy samples from hardware conditioner 604 into random seeds 612 (e.g., random bits) for use by DRBG algorithms on other dies, for example, IC die 106. The algorithms used by DRNG 512 may be compliant across a variety of standards, for example, NIST SP800-90A, B, and C, FIPS-140-2, and ANSI X9.82. Compliance to these standards makes DRNG 512 a viable solution for highly regulated application domains in government and commerce.

In various embodiments, random numbers 608 and/or random seeds 612 may be encrypted by PUF circuit 514 in IC die 510 and communicated to PUF circuit 516 on IC die 106 for further processing. Thus, although random numbers 608 and/or random seeds 612 are generated on separate IC die 510, the encrypted and secure communication thereof facilitated by PUF circuits 514 and 516 and the high density and low latency of interconnects 126 (e.g., comprising hybrid bonds) enables IC die 106 to use random numbers 608 and/or random seeds 612 as though generated on the same IC die 106.

Figure 7:
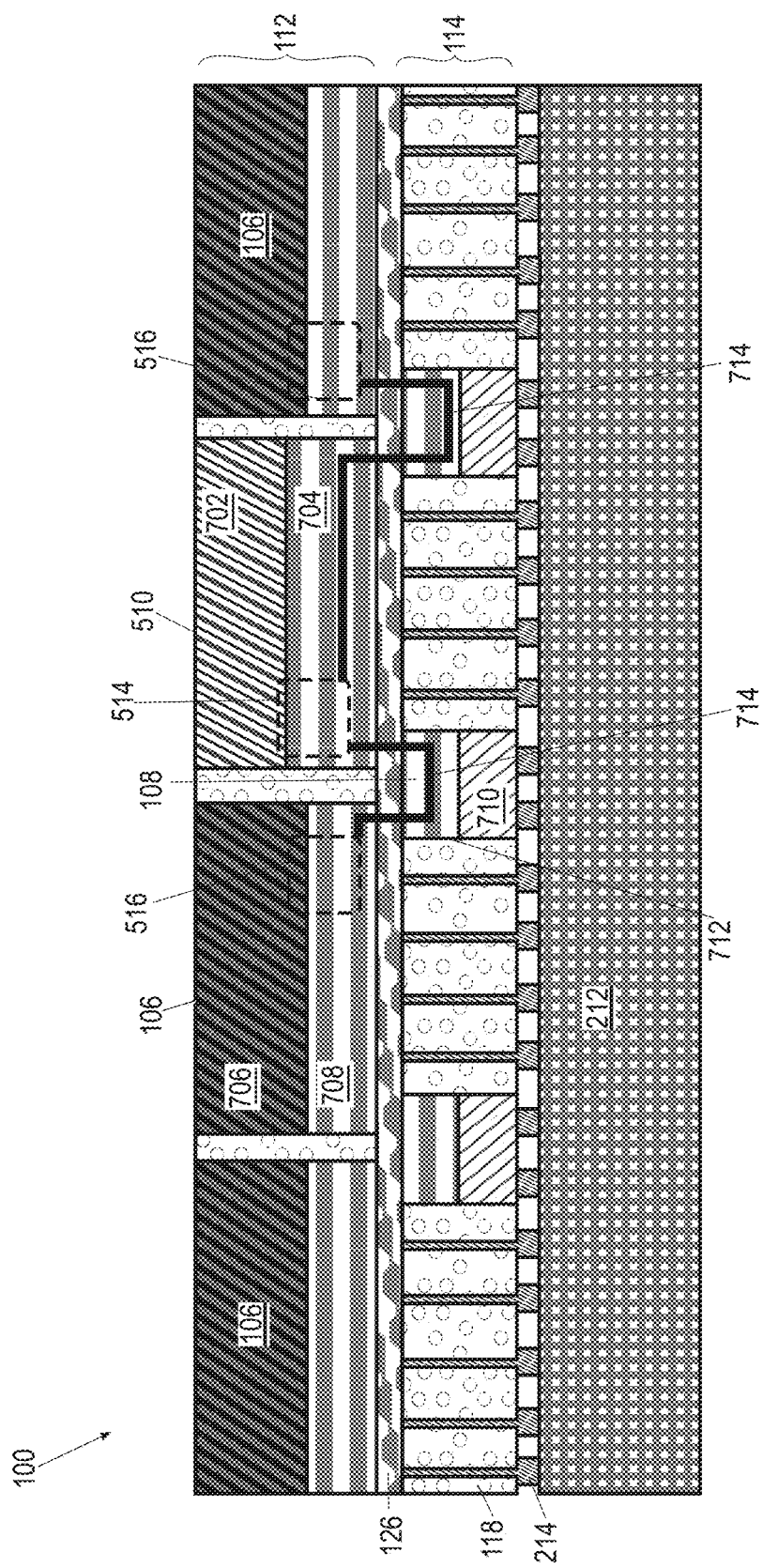
FIG. 7 is a simplified cross-sectional view of an example embodiment of the microelectronic assembly of FIG. 5, according to some embodiments of the present disclosure.

FIG. 7 is a simplified cross-sectional view of an example microelectronic assembly 100. IC dies 106 and 510 may be in first level 112 and IC dies 108 may be in second level 114. First level 112 and second level 114 may be coupled by interconnects 126 comprising hybrid bonds in some embodiments. Second level 114 may be coupled to package substrate 212 with interconnects 214. IC dies 108 may be surrounded by insulator 118 with TDVs therethrough as described in the previous figures (e.g., FIGS. 1B, 2, 3). IC dies 108 may comprise conductive pathways that couple IC dies in first level 112, for example, two or more IC dies 106, or IC dies 106 and 510.

PUF circuit 514 in IC die 510 may comprise active components in a substrate 702 and conductive pathways in a metallization stack 704. Likewise, PUF circuit 516 in IC die 106 may comprise active components in a substrate 706 and conductive pathways in a metallization stack 708. IC die 108 may comprise a substrate 710 and a metallization stack 712. Secure, encrypted communication between PUF circuit 514 in IC die 510 and PUF circuit 516 in IC die 106 may be over a conductive pathway 714. Described from IC die 510 to IC die 106 merely for illustrative purposes and not as a limitation, conductive pathway 714 may be from PUF circuit 514 in IC die 510 through metallization stack 704, interconnects 126 between IC dies 510 and 108, metallization stack 712 in IC die 108, interconnects 126 between IC dies 106 and 108, and metallization stack 708 to PUF circuit 516 in IC die 106 in various embodiments.

Figure 8:
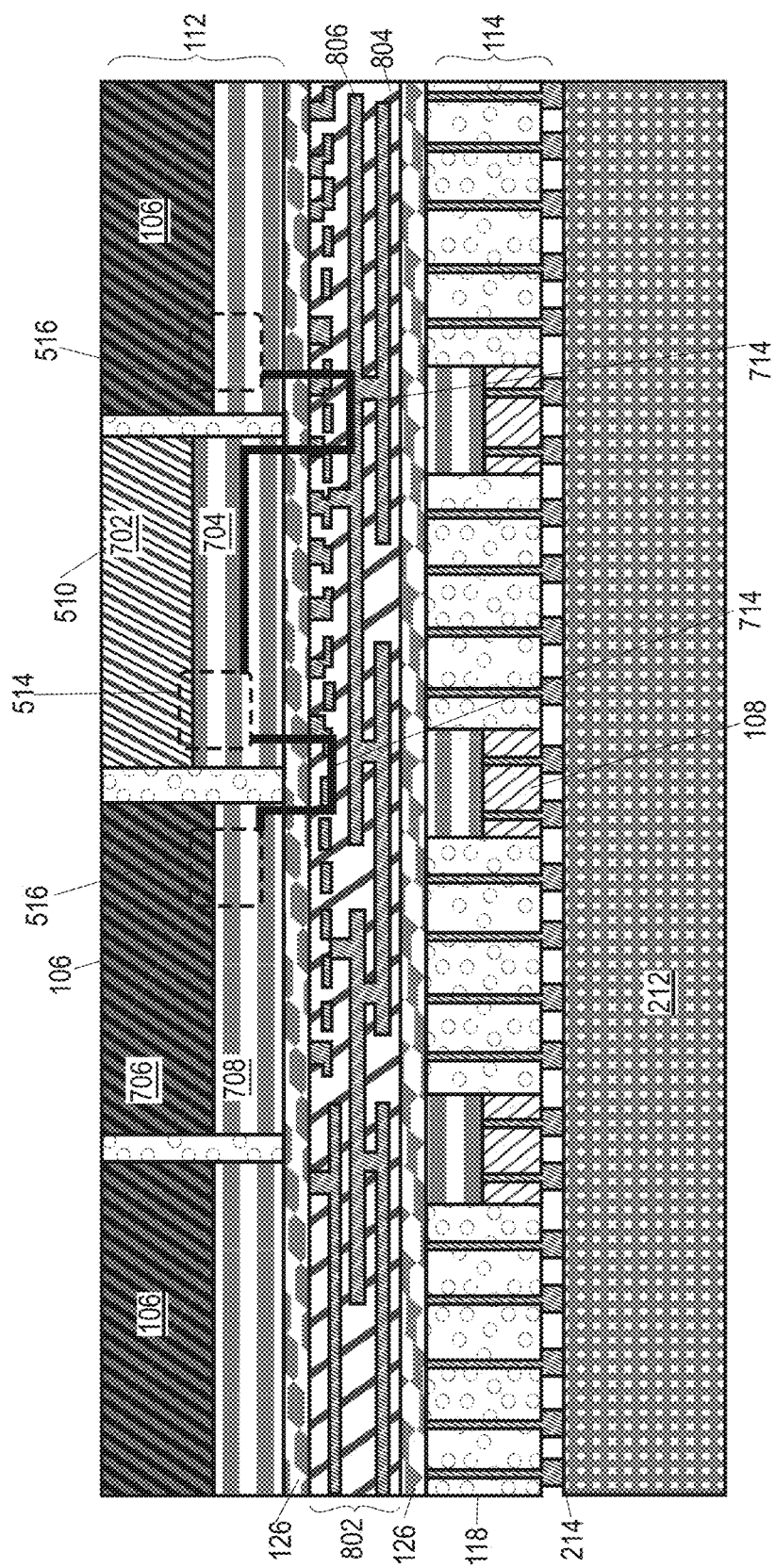
FIG. 8 is a simplified cross-sectional view of another example embodiment of the microelectronic assembly of FIG. 5, according to some embodiments of the present disclosure.

FIG. 8 is a simplified cross-sectional view of an example microelectronic assembly 100. The components are structures as shown in FIG. 8 are substantially identical to those shown in FIG. 7, except for a redistribution layer 802 between first level 112 and second level 114. Redistribution layer 802 may comprise a dielectric material 804 and conductive traces 806 therethrough. In some embodiments, redistribution layer 802 may comprise one or more layers of dielectric material 804 with conductive vias coupling conductive traces 806 that is located between two or more layers of dielectric material 804. Dielectric material 804 may comprise the same material as insulator 118 in some embodiments; in other embodiments, dielectric material 804 may comprise a different material. In many embodiments, dielectric material 804 comprises a compound of silicon and at least one of oxygen, nitrogen and carbon (e.g., silicon oxide, silicon nitride, silicon carbide, silicon oxynitride, etc.).

Redistribution layer 802 may be coupled to first level 112 and second level 114 with interconnects 126, comprising for example, hybrid bonds. In such embodiments, the hybrid bonds between first level 112 and redistribution layer 802, for example, are formed from metal-to-metal bonds between the bond pads in first level 112 and conductive pads of conductive traces 806 in redistribution layer 802, and the dielectric-to-dielectric bonds are between the dielectric in metallization stacks of IC dies in first level 112 and insulator between IC dies in first level 112 and dielectric material 804 in redistribution layer 802. The hybrid bonds between second level 114 and redistribution layer 802, for example, are formed from metal-to-metal bonds between the bond pads in second level 114 and conductive pads of conductive traces 806 in redistribution layer 802, and the dielectric-to-dielectric bonds are between the dielectric in metallization stacks of IC dies in second level 114 and insulator between IC dies in second level 114 and dielectric material 804 in redistribution layer 802.

In some embodiments, a portion of conductive pathways between IC dies 106 and IC die 510 may be in redistribution layer 802; and another portion of conductive pathways may be through IC dies 108 in second level. IC dies 108 may couple IC dies in first level 112, for example, two or more IC dies 106, or IC dies 106 and 510. Secure, encrypted communication between PUF circuit 514 in IC die 510 and PUF circuit 516 in IC die 106 may be over conductive pathway 714. Described from IC die 510 to IC die 106 merely for illustrative purposes and not as a limitation, conductive pathway 714 may be from PUF circuit 514 in IC die 510 through metallization stack 704, interconnects 126 between IC die 510 and redistribution layer 802, conductive traces 806, interconnects 126 between IC die 106 and redistribution layer 802, and metallization stack 708 in IC die 106 in various embodiments.

Figure 9:
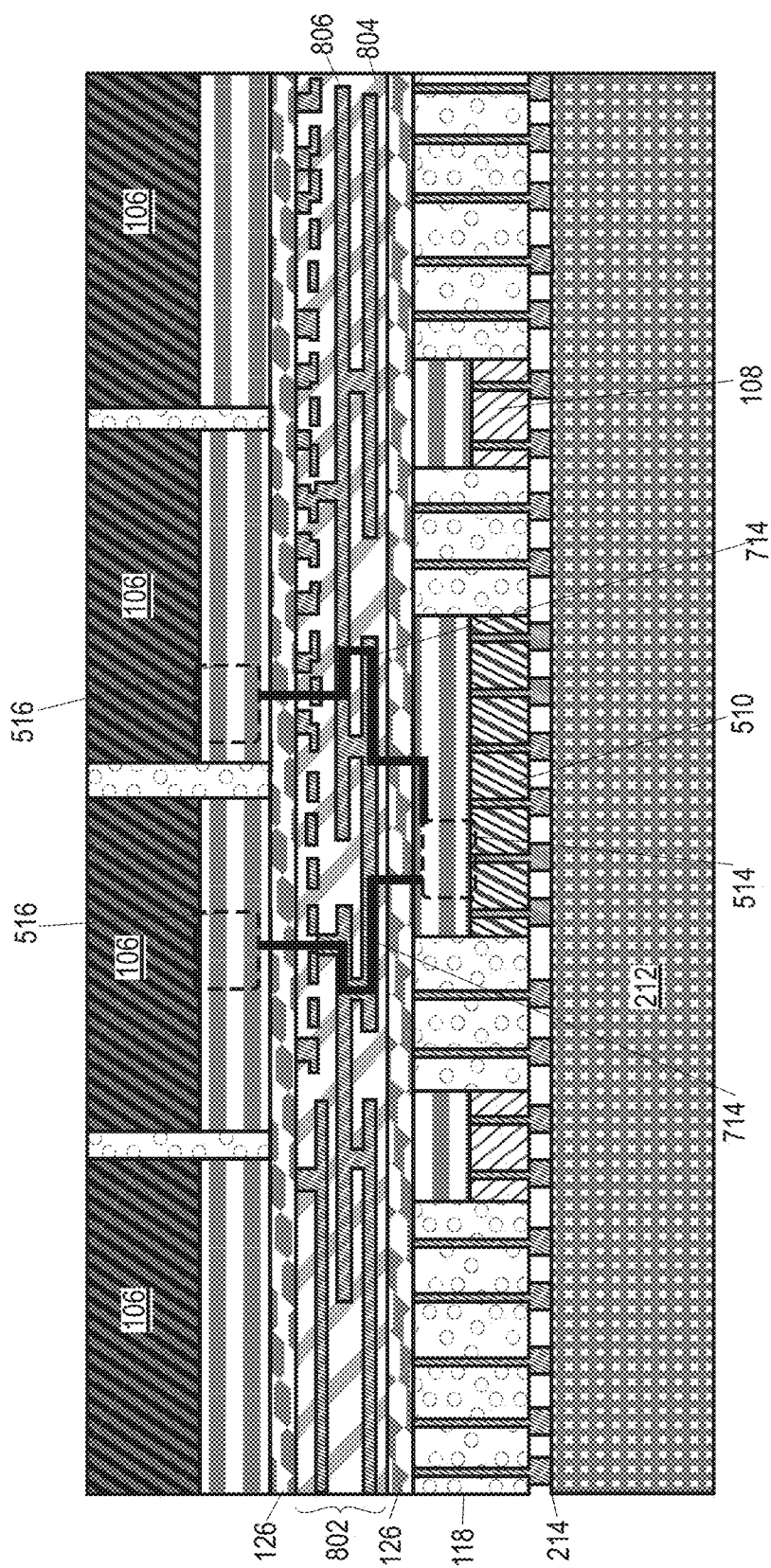
FIG. 9 is a simplified cross-sectional view of yet another example embodiment of the microelectronic assembly of FIG. 5, according to some embodiments of the present disclosure.

FIG. 9 is a simplified cross-sectional view of an example microelectronic assembly 100. The components are structures as shown in FIG. 9 are substantially identical to those shown in FIG. 8, except that IC die 510 is located in second level 114 instead of in first level 112. Secure, encrypted communication between PUF circuit 514 in IC die 510 and PUF circuit 516 in IC die 106 may be over conductive pathway 714. Described from IC die 510 to IC die 106 merely for illustrative purposes and not as a limitation, conductive pathway 714 may be from PUF circuit 514 in IC die 510 through metallization stack 704, interconnects 126 between IC die 510 and redistribution layer 802, conductive traces 806, interconnects 126 between IC dies 106 and redistribution layer 802, and metallization stack 708 in IC die 106 in various embodiments.

FIG. 10 is a simplified cross-sectional view of an example microelectronic assembly 100. The components are structures as shown in FIG. 10 are substantially identical to those shown in FIG. 9, except that IC die 106 comprising PUF circuit 516 may be directly over IC die 510 in second level 114 such that conductive pathway 714 between PUF circuits 514 and 516 is shorter than if PUF circuit 516 were not directly over IC die 510. In such embodiments, secure encrypted communication between PUF circuits 514 and 516 may have lower latency when compared with longer conductive pathways.

Figure 11:
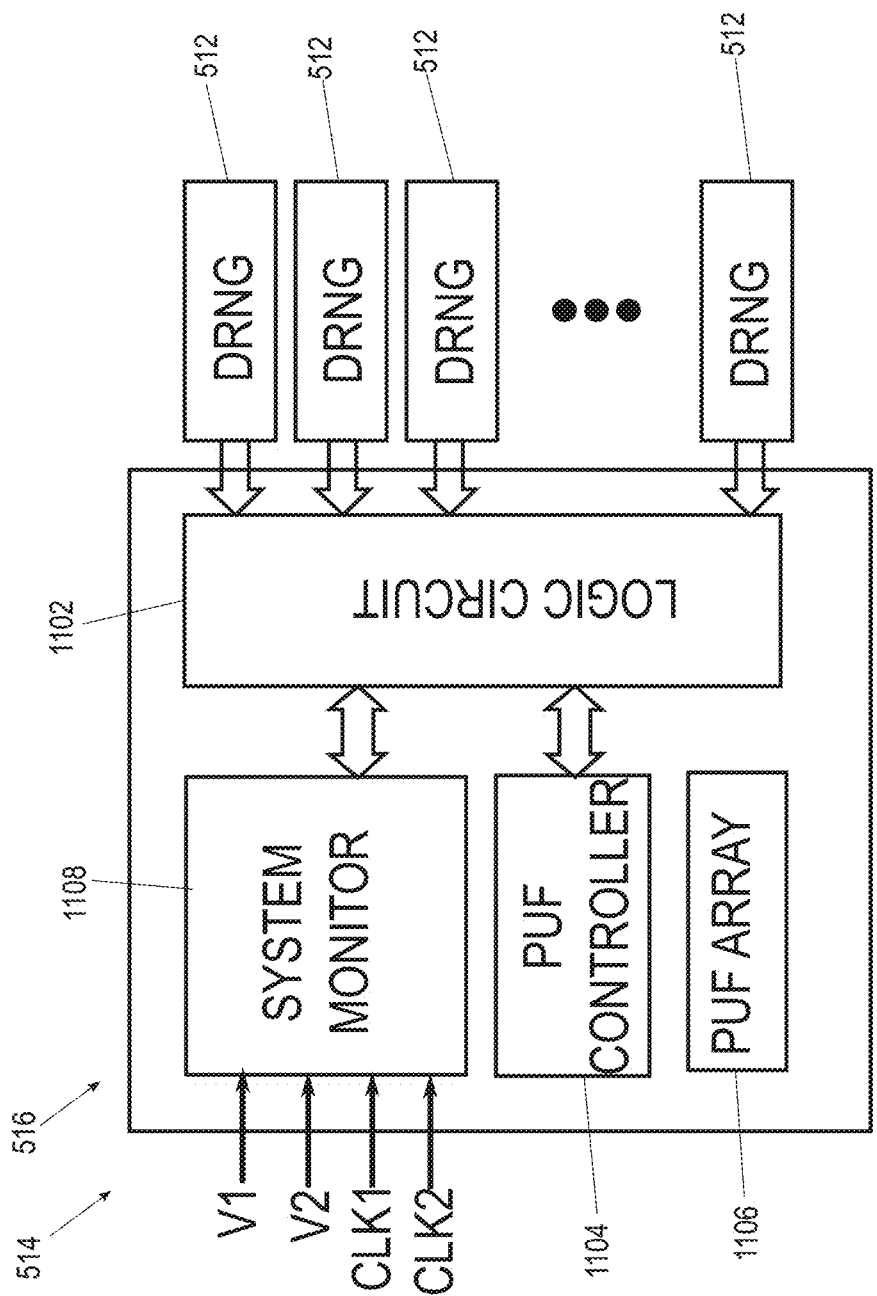
FIG. 11 is a block diagram of an example physical (or physically) unclonable function (PUF) circuit in the microelectronic assembly of FIG. 5, according to some embodiments of the present disclosure.

FIG. 11 is a simplified block diagram of an example electronic circuit for PUF circuit 514 or 516. PUF circuit 514 or 516 typically includes a logic circuit 1102 coupled to one or more DRNG 512. Logic circuit 1102 comprises any suitable circuit, for example, a field programmable gate array (FPGA), a programmable logic device (PLD), a digital signal processor (DSP), a microprocessor, etc. A PUF controller 1104 controls a PUF array 1106 comprising a plurality of components whose physical structures and electrical characteristics may be used to generate the PUF ID and cryptographic key for PUF circuit 514 (or 516). A system monitor 1108 may receive two input voltages (e.g., V1, V2) and two clock readings (e.g., CLK1, CLK2 comprising a voltage variation between a high value and a low value according to a specific frequency). In some embodiments, the inputs and the clock readings to system monitor 1108 are fed to PUF controller 1104 suitably, which uses the information to generate the PUF ID from PUF array 1106. In some embodiments, logic circuit 1102 may use the PUF ID and other inputs as needed to generate a cryptographic key for encrypting the outputs from DRNG 512. In other embodiments, PUF controller 1104 may generate the cryptographic key and provide it to logic circuit 1102, which uses the information to encrypt the outputs from DRNG 512. Although one method is described herein, any suitable method may be used to generate the PUF ID and cryptographic key within the broad scope of the embodiments.

Example Devices and Components

Figure 12:
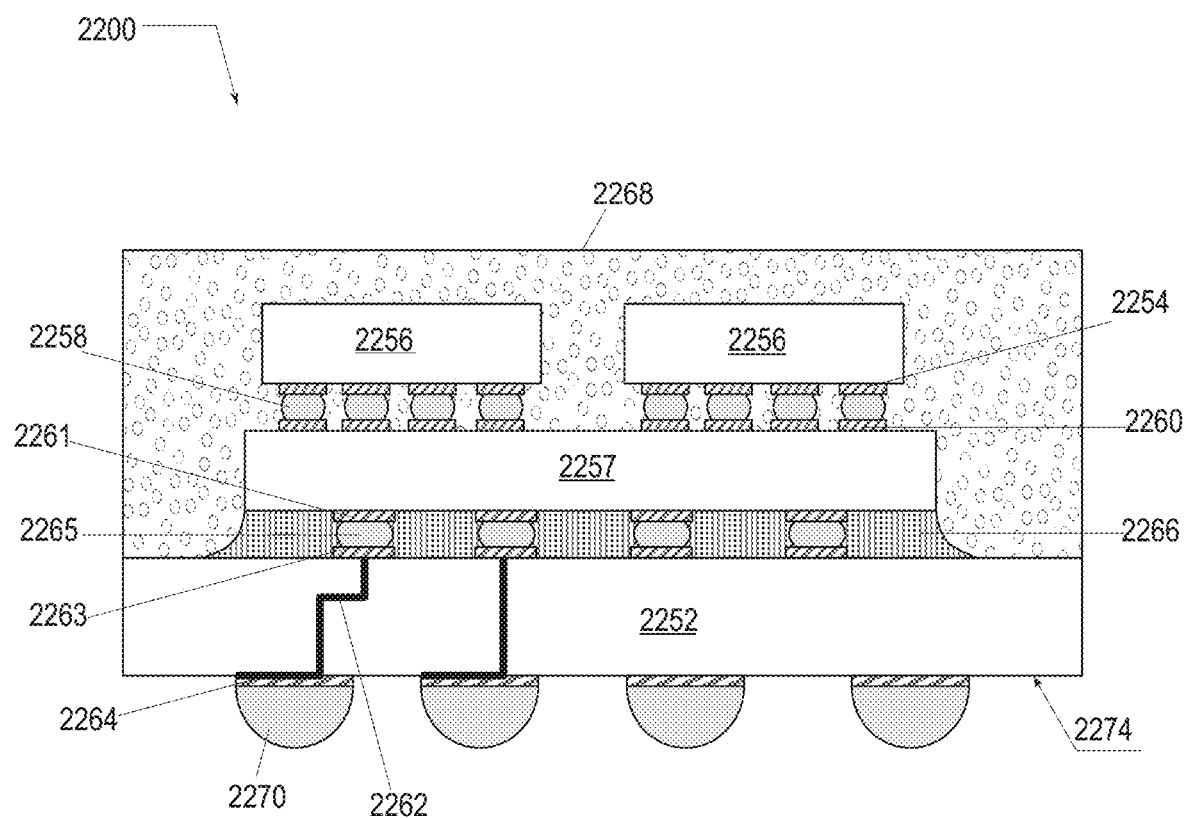
FIG. 12 is a cross-sectional view of a device package that includes one or more microelectronic assemblies in accordance with any of the embodiments disclosed herein.
Figure 13:
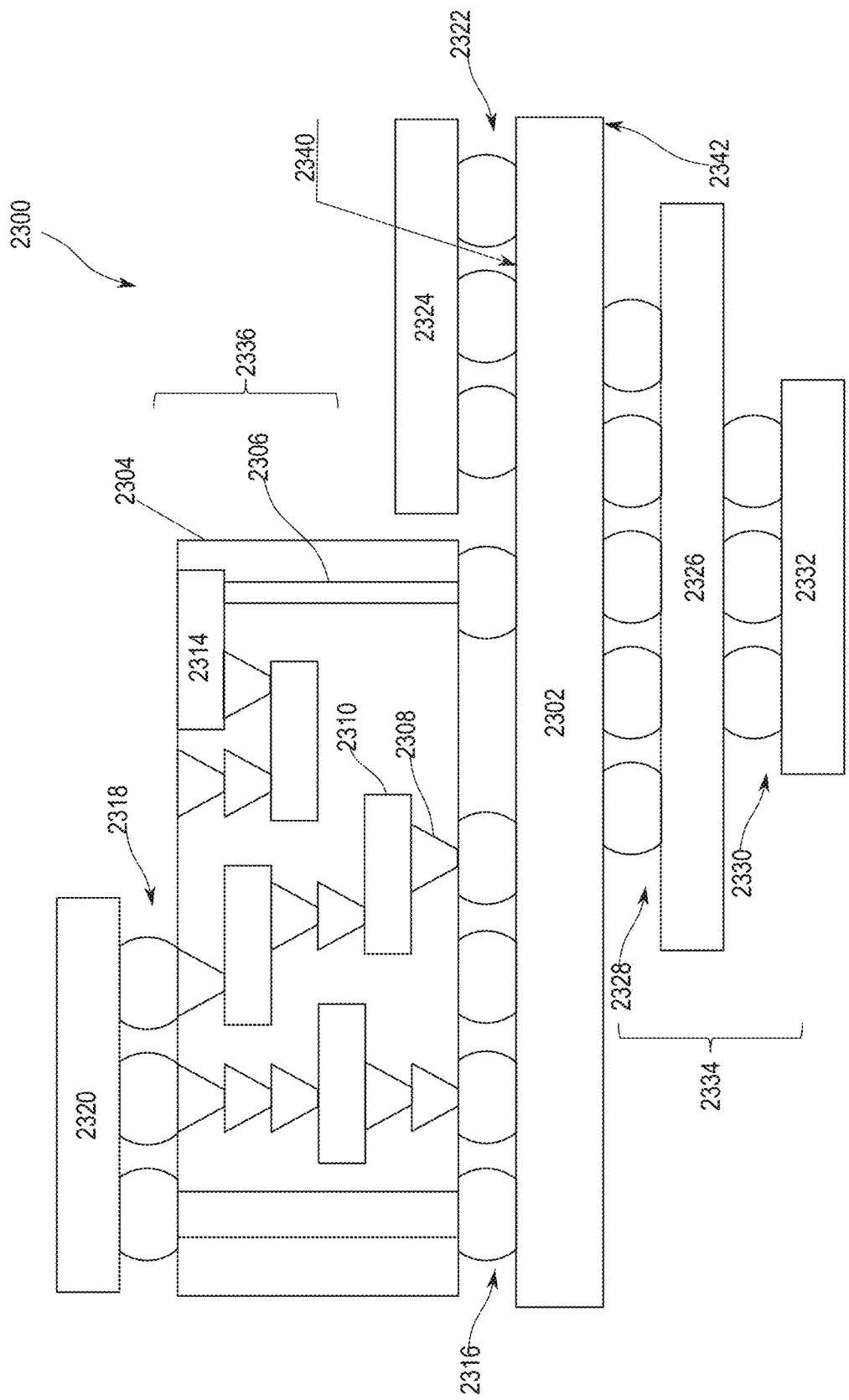
FIG. 13 is a cross-sectional side view of a device assembly that includes one or more microelectronic assemblies in accordance with any of the embodiments disclosed herein.
Figure 14:
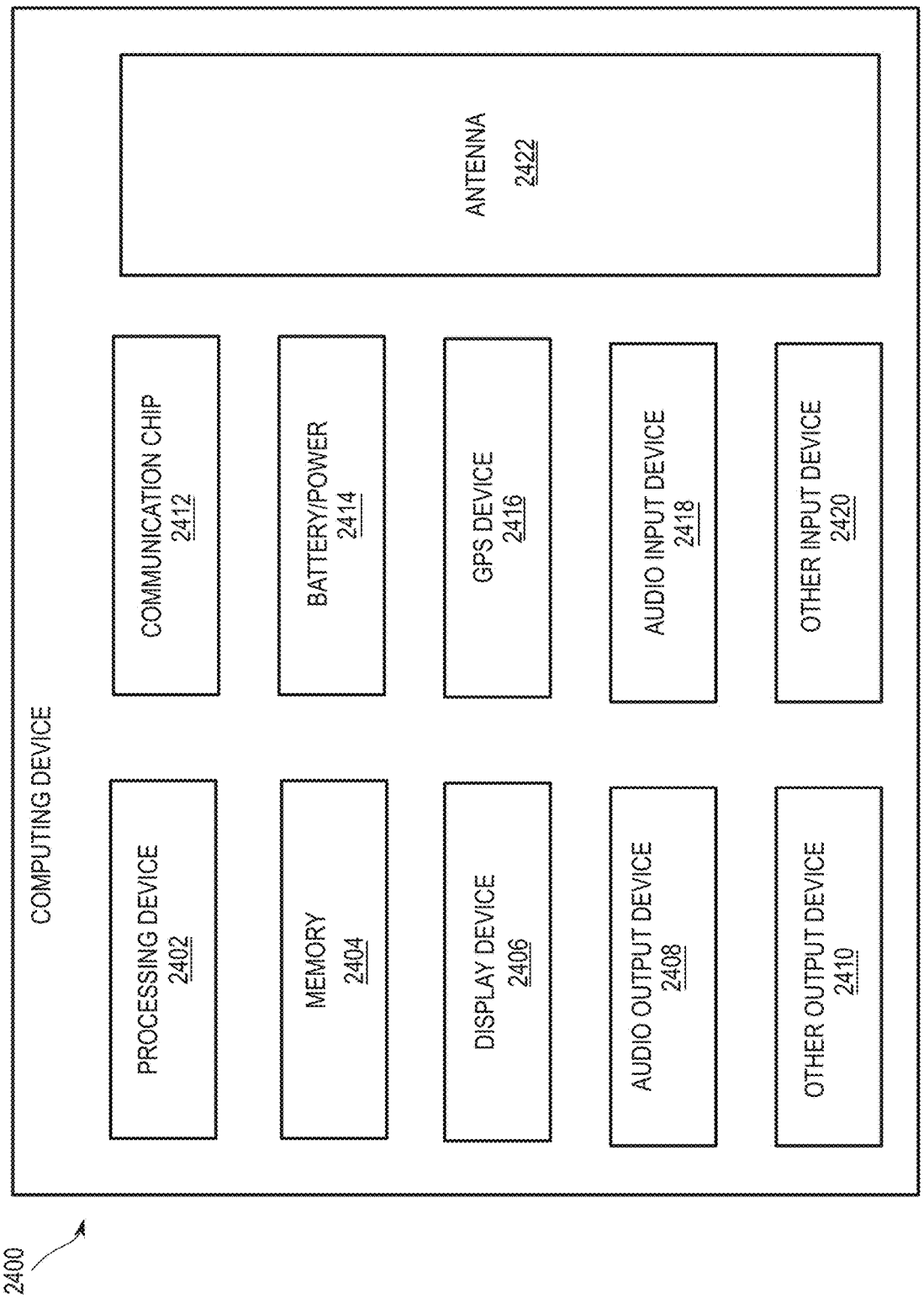
FIG. 14 is a block diagram of an example computing device that includes one or more microelectronic assemblies in accordance with any of the embodiments disclosed herein.

The packages disclosed herein or any further embodiments described herein, may be included in any suitable electronic component. FIGS. 12-14 illustrate various examples of packages, assemblies, and devices that may be used with or include any of the IC packages as disclosed herein.

FIG. 12 is a side, cross-sectional view of an example IC package 2200 that may include IC packages in accordance with any of the embodiments disclosed herein. In some embodiments, the IC package 2200 may be a system-in-package (SiP).

As shown in the figure, package substrate 2252 may be formed of an insulator (e.g., a ceramic, a buildup film, an epoxy film having filler particles therein, etc.), and may have conductive pathways extending through the insulator between first face 2272 and second face 2274, or between different locations on first face 2272, and/or between different locations on second face 2274. These conductive pathways may take the form of any of the interconnect structures comprising lines and/or vias.

Package substrate 2252 may include conductive contacts 2263 that are coupled to conductive pathway 2262 through package substrate 2252, allowing circuitry within dies 2256 and/or interposer 2257 to electrically couple to various ones of conductive contacts 2264 (or to other devices included in package substrate 2252, not shown).

IC package 2200 may include interposer 2257 coupled to package substrate 2252 via conductive contacts 2261 of interposer 2257, first-level interconnects 2265, and conductive contacts 2263 of package substrate 2252. First-level interconnects 2265 illustrated in the figure are solder bumps, but any suitable first-level interconnects 2265 may be used, such as solder bumps, solder posts, or bond wires.

IC package 2200 may include one or more dies 2256 coupled to interposer 2257 via conductive contacts 2254 of dies 2256, first-level interconnects 2258, and conductive contacts 2260 of interposer 2257. Conductive contacts 2260 may be coupled to conductive pathways (not shown) through interposer 2257, allowing circuitry within dies 2256 to electrically couple to various ones of conductive contacts 2261 (or to other devices included in interposer 2257, not shown). First-level interconnects 2258 illustrated in the figure are solder bumps, but any suitable first-level interconnects 2258 may be used, such as solder bumps, solder posts, or bond wires. As used herein, a "conductive contact" may refer to a portion of electrically conductive material (e.g., metal) serving as an interface between different components; conductive contacts may be recessed in, flush with, or extending away from a surface of a component, and may take any suitable form (e.g., a conductive pad or socket).

In some embodiments, underfill material 2266 may be disposed between package substrate 2252 and interposer 2257 around first-level interconnects 2265, and mold 2268 may be disposed around dies 2256 and interposer 2257 and in contact with package substrate 2252. In some embodiments, underfill material 2266 may be the same as mold 2268. Example materials that may be used for underfill material 2266 and mold 2268 are epoxies as suitable. Second-level interconnects 2270 may be coupled to conductive contacts 2264. Second-level interconnects 2270 illustrated in the figure are solder balls (e.g., for a ball grid array (BGA) arrangement), but any suitable second-level interconnects 2270 may be used (e.g., pins in a pin grid array arrangement or lands in a land grid array arrangement). Second-level interconnects 2270 may be used to couple IC package 2200 to another component, such as a circuit board (e.g., a motherboard), an interposer, or another IC package, as known in the art and as discussed below with reference to FIG. 13.

In various embodiments, any of dies 2256 may be microelectronic assembly 100 as described herein. In embodiments in which IC package 2200 includes multiple dies 2256, IC package 2200 may be referred to as a multi-chip package (MCP). Dies 2256 may include circuitry to perform any desired functionality. For example, besides one or more of dies 2256 being microelectronic assembly 100 as described herein, one or more of dies 2256 may be logic dies (e.g., silicon-based dies), one or more of dies 2256 may be memory dies (e.g., high-bandwidth memory), etc. In some embodiments, any of dies 2256 may be implemented as discussed with reference to any of the previous figures. In some embodiments, at least some of dies 2256 may not include implementations as described herein.

Although IC package 2200 illustrated in the figure is a flip-chip package, other package architectures may be used. For example, IC package 2200 may be a BGA package, such as an embedded wafer-level ball grid array (eWLB) package. In another example, IC package 2200 may be a wafer-level chip scale package (WLCSP) or a panel fan-out (FO) package. Although two dies 2256 are illustrated in IC package 2200, IC package 2200 may include any desired number of dies 2256. IC package 2200 may include additional passive components, such as surface-mount resistors, capacitors, and inductors disposed over first face 2272 or second face 2274 of package substrate 2252, or on either face of interposer 2257. More generally, IC package 2200 may include any other active or passive components known in the art.

In some embodiments, no interposer 2257 may be included in IC package 2200; instead, dies 2256 may be coupled directly to conductive contacts 2263 at first face 2272 by first-level interconnects 2265.

FIG. 13 is a cross-sectional side view of an IC device assembly 2300 that may include components having one or more microelectronic assembly 200 in accordance with any of the embodiments disclosed herein. IC device assembly 2300 includes a number of components disposed over a circuit board 2302 (which may be, e.g., a motherboard). IC device assembly 2300 includes components disposed over a first face 2340 of circuit board 2302 and an opposing second face 2342 of circuit board 2302; generally, components may be disposed over one or both faces 2340 and 2342. In particular, any suitable ones of the components of IC device assembly 2300 may include any of the one or more microelectronic assembly 100 in accordance with any of the embodiments disclosed herein; e.g., any of the IC packages discussed below with reference to IC device assembly 2300 may take the form of any of the embodiments of IC package 2200 discussed above with reference to FIG. 12.

In some embodiments, circuit board 2302 may be a PCB including multiple metal layers separated from one another by layers of insulator and interconnected by electrically conductive vias. Any one or more of the metal layers may be formed in a desired circuit pattern to route electrical signals (optionally in conjunction with other metal layers) between the components coupled to circuit board 2302. In other embodiments, circuit board 2302 may be a non-PCB package substrate.

As illustrated in the figure, in some embodiments, IC device assembly 2300 may include a package-on-interposer structure 2336 coupled to first face 2340 of circuit board 2302 by coupling components 2316. Coupling components 2316 may electrically and mechanically couple package-on-interposer structure 2336 to circuit board 2302, and may include solder balls (as shown), male and female portions of a socket, an adhesive, an underfill material, and/or any other suitable electrical and/or mechanical coupling structure.

Package-on-interposer structure 2336 may include IC package 2320 coupled to interposer 2304 by coupling components 2318. Coupling components 2318 may take any suitable form depending on desired functionalities, such as the forms discussed above with reference to coupling components 2316. In some embodiments, IC package 2320 may be or include IC package 2200, e.g., as described above with reference to FIG. 12. In some embodiments, IC package 2320 may include at least one microelectronic assembly 100 as described herein. Microelectronic assembly 100 is not specifically shown in the figure in order to not clutter the drawing.

Although a single IC package 2320 is shown in the figure, multiple IC packages may be coupled to interposer 2304; indeed, additional interposers may be coupled to interposer 2304. Interposer 2304 may provide an intervening package substrate used to bridge circuit board 2302 and IC package 2320. Generally, interposer 2304 may redistribute a connection to a wider pitch or reroute a connection to a different connection. For example, interposer 2304 may couple IC package 2320 to a BGA of coupling components 2316 for coupling to circuit board 2302.

In the embodiment illustrated in the figure, IC package 2320 and circuit board 2302 are attached to opposing sides of interposer 2304. In other embodiments, IC package 2320 and circuit board 2302 may be attached to a same side of interposer 2304. In some embodiments, three or more components may be interconnected by way of interposer 2304.

Interposer 2304 may be formed of an epoxy resin, a fiberglass-reinforced epoxy resin, a ceramic material, or a polymer material such as polyimide. In some implementations, interposer 2304 may be formed of alternate rigid or flexible materials that may include the same materials described above for use in a semiconductor substrate, such as silicon, germanium, and other group III-V and group IV materials. Interposer 2304 may include metal interconnects 2308 and vias 2310, including but not limited to TSVs 2306. Interposer 2304 may further include embedded devices 2314, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio frequency (RF) devices, power amplifiers, power management devices, antennas, arrays, sensors, and microelectromechanical systems (MEMS) devices may also be formed on interposer 2304. Package-on-interposer structure 2336 may take the form of any of the package-on-interposer structures known in the art.

In some embodiments, IC device assembly 2300 may include an IC package 2324 coupled to first face 2340 of circuit board 2302 by coupling components 2322. Coupling components 2322 may take the form of any of the embodiments discussed above with reference to coupling components 2316, and IC package 2324 may take the form of any of the embodiments discussed above with reference to IC package 2320.

In some embodiments, IC device assembly 2300 may include a package-on-package structure 2334 coupled to second face 2342 of circuit board 2302 by coupling components 2328. Package-on-package structure 2334 may include an IC package 2326 and an IC package 2332 coupled together by coupling components 2330 such that IC package 2326 is disposed between circuit board 2302 and IC package 2332. Coupling components 2328 and 2330 may take the form of any of the embodiments of coupling components 2316 discussed above, and IC packages 2326 and/or 2332 may take the form of any of the embodiments of IC package 2320 discussed above. Package-on-package structure 2334 may be configured in accordance with any of the package-on-package structures known in the art.

FIG. 14 is a block diagram of an example computing device 2400 that may include one or more components having one or more IC packages in accordance with any of the embodiments disclosed herein. For example, any suitable ones of the components of computing device 2400 may include a microelectronic assembly with a microelectronic assembly (e.g., 100), in accordance with any of the embodiments disclosed herein. In another example, any one or more of the components of computing device 2400 may include any embodiments of IC package 2200 (e.g., as shown in FIG. 12). In yet another example, any one or more of the components of computing device 2400 may include an IC device assembly 2300 (e.g., as shown in FIG. 13).

A number of components are illustrated in the figure as included in computing device 2400, but any one or more of these components may be omitted or duplicated, as suitable for the application. In some embodiments, some or all of the components included in computing device 2400 may be attached to one or more motherboards. In some embodiments, some or all of these components are fabricated onto a single SoC die.

Additionally, in various embodiments, computing device 2400 may not include one or more of the components illustrated in the figure, but computing device 2400 may include interface circuitry for coupling to the one or more components. For example, computing device 2400 may not include a display device 2406, but may include display device interface circuitry (e.g., a connector and driver circuitry) to which display device 2406 may be coupled. In another set of examples, computing device 2400 may not include an audio input device 2418 or an audio output device 2408, but may include audio input or output device interface circuitry (e.g., connectors and supporting circuitry) to which audio input device 2418 or audio output device 2408 may be coupled.

Computing device 2400 may include a processing device 2402 (e.g., one or more processing devices). As used herein, the term "processing device" or "processor" may refer to any device or portion of a device that processes electronic data from registers and/or memory to transform that electronic data into other electronic data that may be stored in registers and/or memory. Processing device 2402 may include one or more digital signal processors (DSPs), ASICs, CPUs, GPUs, cryptoprocessors (specialized processors that execute cryptographic algorithms within hardware), server processors, or any other suitable processing devices. Computing device 2400 may include a memory 2404, which may itself include one or more memory devices such as volatile memory (e.g., dynamic random access memory (DRAM)), nonvolatile memory (e.g., read-only memory (ROM)), flash memory, solid state memory, and/or a hard drive. In some embodiments, memory 2404 may include memory that shares a die with processing device 2402. This memory may be used as cache memory and may include embedded dynamic random access memory (eDRAM) or spin transfer torque magnetic random access memory (STT-MRAM).

In some embodiments, computing device 2400 may include a communication chip 2412 (e.g., one or more communication chips). For example, communication chip 2412 may be configured for managing wireless communications for the transfer of data to and from computing device 2400. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

Communication chip 2412 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 2412 may operate in accordance with a Global System for Mobile Communication (GSM), General Packet Radio Service (GPRS), Universal Mobile Telecommunications System (UMTS), High-Speed Packet Access (HSPA), Evolved HSPA (E-HSPA), or LTE network. The communication chip 2412 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). Communication chip 2412 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. Communication chip 2412 may operate in accordance with other wireless protocols in other embodiments. Computing device 2400 may include an antenna 2422 to facilitate wireless communications and/or to receive other wireless communications (such as AM or FM radio transmissions).

In some embodiments, communication chip 2412 may manage wired communications, such as electrical, optical, or any other suitable communication protocols (e.g., the Ethernet). As noted above, communication chip 2412 may include multiple communication chips. For instance, a first communication chip 2412 may be dedicated to shorter-range wireless communications such as Wi-Fi or Bluetooth, and a second communication chip 2412 may be dedicated to longer-range wireless communications such as global positioning system (GPS), EDGE, GPRS, CDMA, WiMAX, LTE, EV-DO, or others. In some embodiments, a first communication chip 2412 may be dedicated to wireless communications, and a second communication chip 2412 may be dedicated to wired communications.

Computing device 2400 may include battery/power circuitry 2414. Battery/power circuitry 2414 may include one or more energy storage devices (e.g., batteries or capacitors) and/or circuitry for coupling components of computing device 2400 to an energy source separate from computing device 2400 (e.g., AC line power).

Computing device 2400 may include a display device 2406 (or corresponding interface circuitry, as discussed above). Display device 2406 may include any visual indicators, such as a heads-up display, a computer monitor, a projector, a touchscreen display, a liquid crystal display (LCD), a light-emitting diode display, or a flat panel display, for example.

Computing device 2400 may include audio output device 2408 (or corresponding interface circuitry, as discussed above). Audio output device 2408 may include any device that generates an audible indicator, such as speakers, headsets, or earbuds, for example.

Computing device 2400 may include audio input device 2418 (or corresponding interface circuitry, as discussed above). Audio input device 2418 may include any device that generates a signal representative of a sound, such as microphones, microphone arrays, or digital instruments (e.g., instruments having a musical instrument digital interface (MIDI) output).

Computing device 2400 may include a GPS device 2416 (or corresponding interface circuitry, as discussed above). GPS device 2416 may be in communication with a satellite-based system and may receive a location of computing device 2400, as known in the art.

Computing device 2400 may include other output device 2410 (or corresponding interface circuitry, as discussed above). Examples of other output device 2410 may include an audio codec, a video codec, a printer, a wired or wireless transmitter for providing information to other devices, or an additional storage device.

Computing device 2400 may include other input device 2420 (or corresponding interface circuitry, as discussed above). Examples of other input device 2420 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

Computing device 2400 may have any desired form factor, such as a handheld or mobile computing device (e.g., a cell phone, a smart phone, a mobile internet device, a music player, a tablet computer, a laptop computer, a netbook computer, an ultrabook computer, a personal digital assistant (PDA), an ultramobile personal computer, etc.), a desktop computing device, a server or other networked computing component, a printer, a scanner, a monitor, a set-top box, an entertainment control unit, a vehicle control unit, a digital camera, a digital video recorder, or a wearable computing device. In some embodiments, computing device 2400 may be any other electronic device that processes data.

SELECT EXAMPLES

The following paragraphs provide various examples of the embodiments disclosed herein.

Example 1 provides a microelectronic assembly (e.g., 100, FIG. 7), comprising: a first plurality of IC dies (e.g., 106) in a first level (e.g., 112), each one of the first plurality of IC dies having respective first physical unclonable function (PUF) circuits (e.g., 516), each one of the first PUF circuits configured to generate a respective unique first PUF identifier; a second IC die (e.g., 510) having a second PUF circuit (e.g., 514) and a security circuit (e.g., 512), the second PUF circuit configured to generate a unique second PUF identifier, the security circuit configured to be an entropy source; a second plurality of IC dies (e.g., 108) in a second level (e.g., 114), the second level not coplanar with the first level, the first level and the second level being coupled with interconnects (e.g., 126) having a pitch of less than 10 micrometers between adjacent ones of the interconnects; and conductive pathways (e.g., 714) between the first plurality of IC dies and the second IC die for communication between the first PUF circuits and the second PUF circuit, the conductive pathways comprising a portion of the interconnects, in which: each one of the first PUF circuits is further configured to (e.g., FIG. 6A): identify the second PUF circuit by the second PUF identifier, and generate a first cryptographic key encrypting a request to the security circuit for entropy, and the second PUF circuit is configured to: identify each one of the first PUF circuits by the respective first PUF identifiers, and generate a second cryptographic key encrypting a response from the security circuit to the request.

Example 2 provides the microelectronic assembly of example 1, in which (e.g., FIG. 7): the second IC die is in the first level, and a portion of the conductive pathways is through the second plurality of IC dies in the second level.

Example 3 provides the microelectronic assembly of example 1, further comprising a redistribution layer (e.g., 802) between the first level and the second level, in which the redistribution layer is coupled to the first level and the second level with the interconnects.

Example 4 provides the microelectronic assembly of example 3, in which (e.g., FIG. 8): the second IC die is in the first level, and a portion of the conductive pathways is through the redistribution layer.

Example 5 provides the microelectronic assembly of example 3, in which (e.g., FIG. 9): the second IC die is in the second level, and a portion of the conductive pathways is through the redistribution layer.

Example 6 provides the microelectronic assembly of example 5, in which the first IC die is directly over the second IC die (e.g., FIG. 10).

Example 7 provides the microelectronic assembly of any one of examples 1-6, in which (e.g., FIG. 6B) the security circuit comprises a digital random number generator circuit, comprising a hardware entropy source, a hardware conditioner, and at least one of a hardware deterministic random bit generator and a hardware nondeterministic random bit generator.

Example 8 provides the microelectronic assembly of any one of examples 1-7, in which the entropy comprises a sequence of at least one of random numbers and random bits.

Example 9 provides the microelectronic assembly of any one of examples 1-8, in which any one of the conductive pathways is through a first metallization stack of one of the first plurality of IC dies, a second metallization stack of the second IC die and the portion of the interconnects.

Example 10 provides the microelectronic assembly of any one of examples 1-9, in which (e.g., FIG. 11) the first PUF circuit and the second PUF circuit comprises respective PUF arrays, PUF controllers to control the PUF arrays, and logic circuits to generate the first unique identifier and the second unique identifier respectively.

Example 11. An IC package, comprising: a first IC die (e.g., 106) comprising a first PUF circuit to generate a first PUF identifier and a first cryptographic key; a second IC die (e.g., 510) comprising a second PUF circuit to generate a second PUF identifier and a second cryptographic key, the second IC die further comprising a digital random number generator circuit to generate random numbers or random bits; a third IC die (e.g., 108); and a package substrate (e.g., 212) coupled at least to the third IC die, in which: the first IC die is in a first level, the third IC die is in a second level not coplanar with the first level, the first level and the second level are coupled by interconnects having a pitch of less than 10 micrometers between adjacent ones of the interconnects, and communication between the first PUF circuit and the second PUF circuit is configured to be through a conductive pathway, the conductive pathway comprising a portion of the interconnects and the communication being encrypted using the first PUF identifier, the first cryptographic key, the second PUF identifier and the second cryptographic key.

Example 12 provides the IC package of example 11, in which the second IC die is in the first level (e.g., FIGS. 7, 8).

Example 13 provides the IC package of example 11, in which the second IC die is in the second level (e.g., FIGS. 9, 10).

Example 14 provides the IC package of example 13, in which the first IC die in the first level is directly over the second IC die in the second level (e.g., FIG. 10).

Example 15 provides the IC package of any one of examples 11-12, in which a portion of the conductive pathway is through the third IC die in the second level (e.g., FIG. 7).

Example 16 provides the IC package of example 11, further comprising a redistribution layer (e.g., 802) between the first level and the second level, in which a portion of the conductive pathway is through the redistribution layer.

Example 17 provides the IC package of example 16, in which the redistribution layer comprises conductive traces (e.g., 806) in a dielectric material (e.g., 804).

Example 18 provides the IC package of example 17, in which the redistribution layer comprises a plurality of layers of the dielectric material, with the conductive traces between adjacent layers of the dielectric material, and conductive vias connecting the conductive traces through the layers of the dielectric material.

Example 19 provides an IC device (e.g., 510), comprising: a security circuit (e.g., 512); and a first PUF circuit (e.g., 514), in which: the IC device is coupled to a plurality of IC dies (e.g., 106) having respective second PUF circuits (e.g., 516), the IC device and the plurality of IC dies are coupled together in an IC package, the first PUF circuit and the second PUF circuits are configured to communicate securely with each other through conductive pathways in the IC package, the security circuit is configured to provide entropy services to the plurality of IC dies, and the entropy services comprise providing a sequence of random numbers or random bits.

Example 20 provides the IC device of example 19, in which the conductive pathways comprise interconnects having a pitch of less than 10 micrometers between adjacent ones of the interconnects.

Example 21 provides the IC device of any one of examples 19-20, in which the first PUF circuit is configured to generate a first PUF identifier to identify the IC device, and the second PUF circuits are configured to generate respective second PUF identifiers to identify the respective ones of the plurality of IC dies.

Example 22 provides the IC device of any one of examples 19-21, in which the second PUF circuit comprises a logic circuit, a system monitor, a controller and a PUF array (e.g., FIG. 11).

Example 23 provides the IC device of example 22, in which the PUF array comprises an array of ring oscillators.

Example 24 provides the IC device of any one of examples 19-23, in which the security circuit comprises a digital random number generator circuit, comprising a hardware entropy source, a hardware conditioner, and at least one of a hardware deterministic random bit generator and a hardware nondeterministic random bit generator (e.g., FIG. 6B).

Example 25 provides the IC device of example 24, in which: the hardware entropy source is configured to produce random bits from a nondeterministic hardware process, the hardware conditioner is configured to distill the random bits into high-quality nondeterministic random numbers, the hardware deterministic random bit generator is configured to generate random numbers seeded from the hardware conditioner, and the hardware nondeterministic random bit generator is configured to provide random seeds generated from the hardware conditioner.

Example 26 provides an IC package, comprising: a first IC die, in which the first IC die is to use entropy services, the first IC die, including a PUF circuit, and lacking a random number generator (RNG) circuit; a second IC die comprising: another PUF circuit; and an RNG circuit to generate random numbers for the entropy services; a conductive pathway between the first IC die and the second IC die, in which encryption of the conductive pathway is enabled using the PUF circuits; and a package support structure.

Example 27 provides the IC package of example 26 further comprising a third IC die between the first IC die and the package support.

Example 28 provides the IC package of example 27, in which the third IC die is between the second IC die and package support.

Example 29 provides the IC package of example 26, in which the second IC die is between the first IC die and the package support.

Example 30 provides the IC package of example 27, further comprising a redistribution layer (RDL) between the first IC die and the third IC die.

Example 31 provides the IC package of example 30, further comprising a hybrid bonding layer between the first IC die and the RDL.

Example 32 provides the IC package of example 27, further comprising a redistribution layer (RDL) between second IC die and the third IC die.

Example 33 provides the IC package of example 32, further comprising a hybrid bonding layer between the second IC die and the RDL.

Example 34 provides the IC package of example 26, further comprising a redistribution layer (RDL) between the first IC die and the second IC die.

Example 35 provides the IC package of example 26, further comprising a fourth IC die, in which the fourth IC die shadows the second IC die.

Example 36 provides the IC package of example 35, in which the second IC die is between the package support and the fourth IC die.

Example 37 provides the IC package of example 35, further comprising a redistribution layer (RDL) between the second IC die and the fourth IC die.

Example 38 provides the IC package of example 27, further comprising a hybrid bonding layer between the first IC die and the third IC die.

Example 39 provides the IC package of example 27, further comprising a hybrid bonding layer between the second IC die and the third IC die.

Example 40 provides the IC package of example 26, further comprising a hybrid bonding layer between the first IC die and the second IC die.

Example 41 provides the IC package of example 26, in which the first IC die comprises a hard intellectual property core.

Example 42 provides the IC package of any one of examples 26-41, in which the second IC die comprises active circuitry for security functions.

Example 43 provides the IC package of example 27, in which the third IC die is connected to the first IC die and to the second IC die via interconnect structures, the third IC die providing a connection between the first IC die and the third IC die.

Example 44 provides a microelectronic assembly, comprising: a first IC die, in which the first IC die lacks a RNG; and a second IC die electrically coupled to the first IC die, the second IC die to provide the entropy service to the first IC die using a conductive pathway between the second IC die and the first IC die, in which the conductive pathway is encrypted.

Example 45 provides the microelectronic assembly of example 44, in which encryption of the conductive pathway is enabled using a PUF of the first IC die and a PUF of the second IC die.

Example 46 provides the microelectronic assembly of any of examples 44-45, in which the first IC die comprises a plurality of first IC dies and in which the second IC die is electrically coupled to the plurality of first IC dies to provide entropy services to the plurality of first IC dies.

Example 47 provides the microelectronic assembly of any of examples 44-46, in which the second IC die includes at least one RNG.

Example 48 provides the microelectronic assembly of example 47, in which the RNG comprises a digital RNG (DRNG).

Example 49 provides the microelectronic assembly of any of examples 44-48, in which the second IC die includes a plurality of RNGs.

Example 50 provides the microelectronic assembly of example 44, in which the first IC die includes a PUF for encryption of data communicated over the conductive pathway.

Example 51 provides the microelectronic assembly of any of examples 44-50, in which the first IC die includes a memory element to store a cryptographic key used by the PUF of the first IC die.

Example 52 provides the microelectronic assembly of example 44, in which the second IC die comprises a PUF, in which encryption of the conductive pathway is enabled by the PUF.

Example 53 provides the microelectronic assembly of example 52, in which the PUF comprises an array of PUFs, the second IC die further including a PUF controller to control operation of PUFs of the array of PUFs.

Example 54 provides an IC device, comprising a first IC die to provide entropy services to a second IC die, where the second IC die includes a PUF and lacks a RNG, the first IC die comprising: an RNG to generate a cryptographic key for the second IC die; and a PUF to provide the cryptographic key to the second IC die.

Example 55 provides the IC device of example 54, in which the RNG comprises a DRNG.

Example 56 provides the IC device of any of examples 54-55, in which the RNG comprises a plurality of RNGs.

Example 57 provides the IC device of any of examples 54-56, further comprising a conductive pathway between the first and second IC dies, in which the conductive pathway is encrypted.

Example 58 provides the IC device of any of examples 54-57, in which the PUF of the first IC die comprises an array of PUFs.

Example 59 provides the IC device of example 58, in which the first IC die further comprises a PUF controller to control operation of the PUFs.

Example 60 provides the IC device of any of examples 54-59, in which the PUFs comprise physical security primitives.

Example 61 provides the IC device of any of examples 54-59, in which the RNG comprises a physical security primitive.

The above description of illustrated implementations of the disclosure, including what is described in the abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

The invention claimed is:

1. A microelectronic assembly, comprising:
a first plurality of integrated circuit (IC) dies in a first level, each one of the first plurality of IC dies having respective first physical unclonable function (PUF) circuits, each one of the first PUF circuits configured to generate a respective unique first PUF identifier;
a second IC die having a second PUF circuit and a security circuit, the second PUF circuit configured to generate a unique second PUF identifier, the security circuit configured to be an entropy source;
a second plurality of IC dies in a second level, the second level not coplanar with the first level, the first level and the second level being coupled with interconnects having a pitch of less than 10 micrometers between adjacent ones of the interconnects; and
conductive pathways between the first plurality of IC dies and the second IC die for communication between the first PUF circuits and the second PUF circuit, the conductive pathways comprising a portion of the interconnects, wherein:
each one of the first PUF circuits is further configured to:
identify the second PUF circuit by the second PUF identifier, and
generate a first cryptographic key encrypting a request to the security circuit for entropy, and
the second PUF circuit is configured to:
identify each one of the first PUF circuits by the respective first PUF identifiers, and
generate a second cryptographic key encrypting a response from the security circuit to the request.

2. The microelectronic assembly of claim 1, wherein:
the second IC die is in the first level, and
a portion of the conductive pathways is through the second plurality of IC dies in the second level.

3. The microelectronic assembly of claim 1, further comprising a redistribution layer between the first level and the second level, wherein the redistribution layer is coupled to the first level and the second level with the interconnects.

4. The microelectronic assembly of claim 3, wherein:
the second IC die is in the first level, and
a portion of the conductive pathways is through the redistribution layer.

5. The microelectronic assembly of claim 3, wherein:
the second IC die is in the second level, and
a portion of the conductive pathways is through the redistribution layer.

6. The microelectronic assembly of claim 1, wherein the entropy comprises a sequence of at least one of random numbers and random bits.

7. The microelectronic assembly of claim 1, wherein any one of the conductive pathways is through a first metallization stack of one of the first plurality of IC dies, a second metallization stack of the second IC die and the portion of the interconnects.

8. An IC package, comprising:
a first IC die comprising a first PUF circuit to generate a first PUF identifier and a first cryptographic key;
a second IC die comprising a second PUF circuit to generate a second PUF identifier and a second cryptographic key, the second IC die further comprising a digital random number generator circuit to generate random numbers or random bits;
a third IC die; and
a package substrate coupled at least to the third IC die, wherein:
the first IC die is in a first level,
the third IC die is in a second level not coplanar with the first level,
the first level and the second level are coupled by interconnects having a pitch of less than 10 micrometers between adjacent ones of the interconnects, and
communication between the first PUF circuit and the second PUF circuit is configured to be through a conductive pathway, the conductive pathway comprising a portion of the interconnects and the communication being encrypted using the first PUF identifier, the first cryptographic key, the second PUF identifier and the second cryptographic key.

9. The IC package of claim 8, wherein the second IC die is in the first level.

10. The IC package of claim 8, wherein the second IC die is in the second level.

11. The IC package of claim 10, wherein the first IC die in the first level is directly over the second IC die in the second level.

12. The IC package of claim 8, wherein a portion of the conductive pathway is through the third IC die in the second level.

13. The IC package of claim 8, further comprising a redistribution layer between the first level and the second level, wherein a portion of the conductive pathway is through the redistribution layer.

14. An IC device, comprising:
a security circuit; and
a first PUF circuit configured to generate a first PUF identifier and a first cryptographic key,
wherein:
the IC device is coupled to a plurality of IC dies having respective second PUF circuits, wherein one of the plurality of IC dies is configured to generate a second PUF identifier and second cryptographic key,
the IC device and the plurality of IC dies are coupled together in an IC package,
the first PUF circuit and the second PUF circuits are configured to communicate securely with each other through conductive pathways in the IC package, wherein a communication through the conductive pathways in the IC package is encrypted using the first PUF identifier, the first cryptographic key, the second PUF identifier, and the second cryptographic key,
the security circuit is configured to provide entropy services to the plurality of IC dies, and
the entropy services comprise providing a sequence of random numbers or random bits.

15. The IC device of claim 14, wherein the conductive pathways comprise interconnects having a pitch of less than 10 micrometers between adjacent ones of the interconnects.

16. The IC device of claim 14, wherein the first PUF identifier is to identify the IC device, and the second PUF identifier is to identify the one of the plurality of IC dies.

17. The IC device of claim 14, wherein the second PUF circuit comprises a logic circuit, a system monitor, a controller and a PUF array.

18. The IC device of claim 17, wherein the PUF array comprises an array of ring oscillators.

19. The IC device of claim 14, wherein the security circuit comprises a digital random number generator circuit, comprising a hardware entropy source, a hardware conditioner, and at least one of a hardware deterministic random bit generator and a hardware nondeterministic random bit generator.

20. The IC device of claim 19, wherein:
the hardware entropy source is configured to produce random bits from a nondeterministic hardware process,
the hardware conditioner is configured to distill the random bits into high-quality nondeterministic random numbers,
the hardware deterministic random bit generator is configured to generate random numbers seeded from the hardware conditioner, and
the hardware nondeterministic random bit generator is configured to provide random seeds generated from the hardware conditioner.

* * * * *